United States Patent
Achenbach et al.

(10) Patent No.: US 10,669,421 B2
(45) Date of Patent: Jun. 2, 2020

(54) CROSS-LINKABLE SILICONE COMPOSITIONS FOR PRODUCING HIGHLY TRANSPARENT MOLDED PARTS BY MEANS OF BALLISTIC METHODS

(71) Applicant: Wacker Chemie AG, Munich (DE)

(72) Inventors: Frank Achenbach, Simbach (DE); Ernst Selbertinger, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 447 days.

(21) Appl. No.: 15/556,952

(22) PCT Filed: Jan. 10, 2017

(86) PCT No.: PCT/EP2017/050426
§ 371 (c)(1),
(2) Date: Sep. 8, 2017

(87) PCT Pub. No.: WO2017/121733
PCT Pub. Date: Jul. 20, 2017

(65) Prior Publication Data
US 2018/0258229 A1   Sep. 13, 2018

Related U.S. Application Data

(63) Continuation-in-part of application No. PCT/EP2016/050405, filed on Jan. 11, 2016.

(30) Foreign Application Priority Data

Jan. 11, 2016  (WO) ................. PCT/EP2016/050405

(51) Int. Cl.
C08L 83/04       (2006.01)
B33Y 70/00       (2020.01)
B29C 64/112      (2017.01)
C08G 77/20       (2006.01)
B33Y 10/00       (2015.01)
C08L 83/14       (2006.01)
C08G 77/14       (2006.01)
C08G 77/12       (2006.01)
B29K 83/00       (2006.01)

(52) U.S. Cl.
CPC ............ *C08L 83/04* (2013.01); *B29C 64/112* (2017.08); *B33Y 10/00* (2014.12); *B33Y 70/00* (2014.12); *C08G 77/20* (2013.01); *B29K 2083/00* (2013.01); *B29K 2995/0026* (2013.01); *C08G 77/12* (2013.01); *C08G 77/14* (2013.01); *C08L 83/14* (2013.01)

(58) Field of Classification Search
CPC ....... C08L 83/04; C08L 71/02; C09D 183/04; C08K 5/1515
See application file for complete search history.

(56) References Cited

U.S. PATENT DOCUMENTS

| | | | |
|---|---|---|---|
| 6,121,368 A * | 9/2000 | Heying | C08L 83/04 524/493 |
| 9,765,236 B2 * | 9/2017 | Bebenroth | C08L 83/00 |
| 2009/0225640 A1 | 9/2009 | Manabe et al. | |
| 2010/0256300 A1 | 10/2010 | Jandke et al. | |
| 2010/0292361 A1 | 11/2010 | Koellnberger | |
| 2011/0003906 A1 | 1/2011 | Angermaier et al. | |
| 2011/0196096 A1 | 8/2011 | Angermaier et al. | |
| 2012/0142239 A1 * | 6/2012 | Budden | D06M 15/693 442/59 |
| 2013/0200554 A1 | 8/2013 | Mueller | |
| 2018/0094178 A1 * | 4/2018 | Yamamoto | B32B 27/00 |

FOREIGN PATENT DOCUMENTS

| | | |
|---|---|---|
| DE | 102008000156 A1 | 7/2009 |
| DE | 102008043316 A1 | 5/2010 |
| DE | 102009002231 A1 | 10/2010 |
| DE | 102009027486 A1 | 1/2011 |
| DE | 102010043149 A1 | 5/2012 |
| DE | 102011012412 A1 | 8/2012 |
| DE | 102011012480 A1 | 8/2012 |
| EP | 0122008 A1 | 10/1984 |
| EP | 0146307 A2 | 6/1985 |
| EP | 0358452 A2 | 3/1990 |
| EP | 0398701 A2 | 11/1990 |
| EP | 0561893 B1 | 10/1996 |
| EP | 0561919 B1 | 2/1999 |
| EP | 1050538 A2 | 11/2000 |
| EP | 1803728 A1 | 7/2007 |
| WO | 2009027133 A2 | 3/2009 |
| WO | 2012166870 A1 | 12/2012 |
| WO | 2014018814 A1 | 1/2014 |
| WO | 2015059502 A1 | 4/2015 |
| WO | 2015107333 A1 | 7/2015 |

OTHER PUBLICATIONS

A. Gebhardt, Generative Fertigungsverfahren, Carl Hanser Verlag (2013).
English Abstract for A. Gebhardt, Generative Fertigungsverfahren, Carl Hanser Verlag (2013).
English abstract for DE 102011012412 A1.

* cited by examiner

*Primary Examiner* — Marc S Zimmer
(74) *Attorney, Agent, or Firm* — Brooks Kushman P.C.

(57) ABSTRACT

Complex shaped bodies of silicone are produced by ballistic 3D DOD printing by employing a silicone resin-based composition curable by hydrosilylation, which exhibits a high shear thinning behavior and a rapid viscosity recovery rate alter removal of shear.

16 Claims, 3 Drawing Sheets

CROSS-LINKABLE SILICONE COMPOSITIONS FOR PRODUCING HIGHLY TRANSPARENT MOLDED PARTS BY MEANS OF BALLISTIC METHODS

CROSS REFERENCE TO RELATED APPLICATIONS

This application is the U.S. National Phase of PCT Appln. No. PCT/EP2017/050426 filed Jan. 10, 2017, which claims priority to WO Priority No. PCT/EP2016/050405, filed Jan. 11, 2016, the disclosures of which are incorporated in their entirety by reference herein.

BACKGROUND OF THE INVENTION

1. Field of the Invention

The invention relates to crosslinkable silicone compositions whose properties permit the production of highly transparent molded bodies by means of ballistic generative methods (3D printing).

2. Description of the Related Art

Numerous methods are available for producing moldings starting from crosslinkable silicone compositions. Depending on the consistency and crosslinking mechanism of the silicone composition, the production of moldings can take place, for example, by injection molding, by compression molding, by extrusion, by calendering, casting, etc. However, these conventional processing methods are increasingly reaching their limits when silicone moldings of more complex geometry, and/or with differing material compositions and/or with variable property profiles are required. The general trend towards the individualization and individual customization of consumer goods additionally calls for smaller piece numbers, the necessity for rapid availability and simple adaptation to new product series, so that conventional methods are no longer efficient.

A method of producing moldings that is becoming increasingly important is the generative manufacturing method (additive manufacturing; 3D printing method), which includes many different techniques, all of which have in common an automated additive layer build-up of the molding (A. Gebhardt, Generative Fertigungsverfahren, Carl Hanser Verlag, Munich 2013). The generative manufacturing method not only provides the possibility of avoiding the above-mentioned shortcomings of conventional processing methods, but also permits a fundamentally novel design of molded articles.

The additive layerwise build-up of the molding can be effected by the locally selective crosslinking of an applied layer of the crosslinkable material. Locally selective crosslinking can take place, for example, by means of a UV or IR laser. Locally selective crosslinking can also be effected by applying an agent that initiates crosslinking (e.g. catalyst) at a specific location by injection, jetting, spraying, etc., as described for the production of silicone elastomer parts in WO2015/059502 A1.

Locally selective crosslinking means that only the material of the layer that forms the later molded article is crosslinked; the uncrosslinked material is ultimately removed and can optionally be re-used. An additive layerwise build-up of the molding can, however, also be carried out by applying the crosslinkable material in a locally selective manner (e.g. by means of a print head in the form of discrete droplets), that is to say only at those locations that become part of the molding to be formed. The layer applied in this manner will generally not be closed but will directly represent a cross-section of the desired molded body. The locally selectively applied composition is then crosslinked (e.g. by irradiation over the surface), and the next layer is applied in a locally selective manner, etc. If required by the shape of the part that is to be printed (e.g. in the case of overhanging structures, cavities, etc.), a suitable support material can be applied in addition to the crosslinkable silicone material, which support material can be removed again when the printing operation is complete (e.g. by melting or dissolving by means of a solvent). The locally selective application of the crosslinkable composition can be carried out, for example, by the discontinuous (discrete) jetting of droplets (so-called ballistic methods) or by the continuous dispensing of thin strands. In principle, jetting, as compared with dispensing, permits the printing of finer structural details as well as more complex structures. The advantage of dispensing is that it is possible to apply larger amounts of material per unit time. In addition, dispensing also allows higher viscosity materials to be applied, so that it may be advantageous to combine both techniques by fitting one or optionally more dispensing nozzles in the 3D printer in addition to the jetting print nozzle(s). In this manner, it is possible, for example, to build up delicate parts of the molded body by means of the jetting nozzle and to print parts of the molded body of larger volume by dispensing. With regard to the rheological demands that are made by jetting or dispensing on the material to be printed, jetting is found to be considerably more demanding.

WO2015/107333 A1 describes a 3D printing method for producing prostheses from silicone elastomers by (continuous) extrusion of the crosslinkable silicone rubber composition from a mixer nozzle. The 3D printing is optionally assisted by a second mixer nozzle for extruding a thermoplastic material which serves as support material for the silicone rubber composition to be printed. Crosslinking of the silicone rubber composition is effected by platinum-catalyzed addition reaction at room temperature (hydrosilylation). A disadvantage of this method is that the locally accurate placing of very small amounts of the silicone rubber composition in order to print fine details is not possible. Furthermore, the time of crosslinking can no longer be influenced once the two rubber components have been mixed, which has the disadvantage, inter alia, that regions of the silicone rubber composition that have been crosslinked to very different degrees are brought into contact in the course of the printing operation (if the processing time of the rubber composition is shorter than the printing time), or the bearing capacity of the printed structure is not given (processing time longer than printing time).

A special form of the generative manufacturing method are the ballistic methods, which are distinguished in that the locally selective application of the crosslinkable composition is carried out by means of a print head in the form of individual droplets (voxels) (jetting; inkjet printing). The applied composition can subsequently be crosslinked, for example, by means of electromagnetic radiation, whereby a thin layer of the molding is formed. This operation of layerwise build-up is repeated until the complete molded body has been formed.

In the case of the ballistic methods (jetting), a distinction is in principle made between continuous inkjet (CIJ) printing and drop-on-demand (DOD) inkjet printing. Both methods are able to produce droplets having diameters of from 10 µm to several hundred µm.

In the CIJ method, a continuous stream of droplets is produced by ejecting the material from a nozzle under high pressure, and the resulting jet of liquid breaks up into individual droplets as a result of Rayleigh instability. The electrostatically charged droplets are so directed by means of electric deflection plates that they either reach the working plane (substrate) in a locally specific manner or (if printing is not to take place) fall into a return channel, through which they can be guided back for re-use. In the case of crosslinkable silicone rubber compositions, in addition to the risk of contamination, this recycling of the material to be printed involves the serious risk of a substantial change in the rheological properties as a result of the onset of crosslinking and is therefore not practicable.

By contrast, in the DOD method droplets are produced only when required, and all the droplets are deposited in a locally selective manner in order to build up the molding, either by a positioning robot positioning the jetting nozzle precisely in the x, y, z direction, or by the working plane being correspondingly displaced in the x, y, z direction; in principle, the two possibilities can also be implemented simultaneously.

DE 10 2011 012 412 A1 and DE 10 2011 012 480 A1 describe a device and a method for the stepwise production of 3D structures, having a print head arrangement with at least two, preferably from 50 to 200, print head nozzles, which permits the locally selective application optionally of a plurality of photocrosslinkable materials with different photosensitivity, wherein the photocrosslinkable materials are subsequently hardened in a locally selective manner by electromagnetic radiation, in particular by two-photon or multiphoton processes in the focus range of a laser. Application of the photocrosslinkable materials by means of inkjet printing makes special demands on the viscosity of the photocrosslinkable materials. The photocrosslinkable materials are thus distinguished by a viscosity of less than 200 mPa·s, in particular less than 80 mPa·s, and most preferably, less than 40 mPa·s. In order to achieve sufficient crosslinking of the applied material by means of two- or multi-photon polymerization, photoinitiators adapted to the laser wavelength and a polymeric crosslinker component comprising photocrosslinkable groups are required, wherein the photocrosslinkable groups belong to the class of the acrylates, methacrylates, acrylamides, methylacrylamides, urethane acrylates, urethane methacrylates, urea acrylates and urea methacrylates. However, the described method is not suitable for the production of highly transparent moldings consisting of crosslinked silicones. On the one hand, the photoinitiators, photosensitizers, coinitiators, etc. that are used are only poorly soluble in the (non-polar) silicone compositions, which leads to turbidity, microphase separation and inhomogeneities. The radical curing of silicones functionalized with the above-mentioned photocrosslinkable groups is known to have the problem of inhibition caused by oxygen, which leads to a considerable lowering of the crosslinking speed and results in tacky surfaces. If this effect is counteracted by increasing the functional density of, for example, acrylate groups, non-resilient, brittle vulcanizates result. Finally, the extremely high local photon density, generated by pulsed femtosecond lasers, that is required for a multiphoton polymerization (in particular caused by the low functional density of photopolymerizable groups) initiates decomposition reactions (carbonization) in the silicone, which leads to unacceptable discolorations and material damage.

In the DOD method, the resolution of structural details of the molded body to be formed depends especially on the size of the jetted droplets (voxels) and the locally precise application thereof. In general, finer structural details can be produced by means of smaller droplets. However, since the frequency with which the print head produces the droplets is limited, the use of smaller droplets necessarily leads to longer production times of the molding, so that a compromise must be made in an individual case between molding accuracy and production time. However, the size of the droplets, which can be varied within wide limits by suitably designing the print head, depends significantly on the rheological properties of the crosslinkable composition. In general, low viscosity compositions permit the jetting of smaller droplets at a higher frequency, while higher viscosity compositions quickly bring the print heads available at present to their limit.

A closer examination of the DOD method shows that a satisfactory printed image (that is to say a dimensionally accurate molding) is only obtained if the technical parameters of the print head are compatible with the rheological properties in particular of the material to be printed. Important technical parameters of the print head are the pressure difference between the material reservoir and the nozzle outlet, the nozzle diameter, and the time within which the total amount of a drop leaves the nozzle (ejection time). Suitable print heads are in particular (thermal) bubble-jet and piezo print heads, whereby piezo print heads, which are also able to jet higher viscosity materials, are particularly preferred for the printing of silicone moldings. Such print heads are available commercially (e.g. print heads from "NORDSON CORP./USA" and "VERMES MICRODISPENSING GMBH/Germany"). Such piezo print heads allow a pressure in the kbar range to be built up, whereby amounts of liquid in the pl to nl range can be ejected within 1 to 100 us through a nozzle having diameters between 50 and 500 μm at a speed of 1 to 100 m/s. This operation is repeated with a frequency of up to several hundred Hz (these are typical size ranges which can vary considerably in individual cases). In addition to these technical parameters of the print valves, the rheological properties of the material to be printed are also found to be critical. Although the manufacturers of the print valves specify processable viscosities of up to about 2 million mPa·s (at a low shear rate), such highly viscous materials can generally only be jetted if they have extreme shear-thinning behavior. Shear-thinning behavior means that the viscosity of the material falls as the shear rate increases. Since extraordinarily high shear rates of between $10^5$ and $10^6$ $s^{-1}$ occur in the nozzle during jetting with piezo print heads, shear-thinning behavior can bring about a drastic reduction in viscosity during jetting by several orders of magnitude, so that jetting becomes possible. If the shear-thinning behavior of a highly viscous material is too low, the energy of the piezo print valve is not sufficient to force the material through the nozzle and the print head becomes blocked. It is important to note that the material does not leave the nozzle as a finished drop, but a drop-forming operation takes place. The material initially leaves the nozzle in laminar form as a jet, whereby an oval bulge (precursor of the main drop) quickly forms at the front end but remains connected to the nozzle outlet via a thinner material thread. Many different scenarios are then possible. If the material thread breaks off at the nozzlee outlet and then combines with the main drop, a single drop forms, the speed of which slows significantly due to the resilient combining process. If, on the other hand, the material thread breaks off both at the nozzle outlet and at the main drop, a second drop (satellite) can form by resilient contraction. The satellite and the main drop may strike the substrate surface (working plane) one after the other, but they may also combine during the flight phase to form a single drop. However, the broken material thread may also taper at a plurality of points and ultimately form a plurality of satellite drops, each of which may strike the substrate in succession or combine with the main drop during the flight phase. In order to permit the latter, a certain minimum distance of the nozzle outlet from the working plane is necessary. On the other hand, the locally accurate deposition of the drop is adversely affected as the flight time increases so that, in practice, an optimum distance between the nozzle and the substrate must be sought, which is typically in the region of a few millimeters.

If the material thread does not break off immediately at the nozzle outlet (which is substantially determined by the interfacial tension between the nozzle material and the printing material), the portion of the material thread that remains at the nozzle outlet contracts and consequently clogs the nozzle, which leads to failure of the print head. If it is further considered that the positioning robot which positions the print head in the x,y plane moves continuously over the x,y plane (that is to say without stopping at the individual points (x,y)), it will be appreciated that the formation of satellites inevitably results in an unsharp printed image, because the print nozzle has already moved further towards the next (x,y) point by the time the material thread breaks off at the nozzle outlet (typical speeds of the positioning unit are between 0.1 and 1 m/s).

The drop which meets the working plane at high speed can likewise behave in different ways. For example, it can be deformed into a spherical-segment-, cone- or donut-like structure, whereby the mostly circular base surface of this structure has a larger diameter than the nozzle or the drop as a result of spreading of the drop. The drop can also form a crown-like structure as it meets the surface, which then immediately splashes tiny droplets in the radial direction. This splashing also results in an unclean printed image. The placed drop may still have a very low viscosity owing to the extremely high shear rate in the nozzle as a result of slow relaxation and may spread too much. On the other hand, too rapid relaxation to the high starting viscosity can lead, if a flow limit is present, to droplet structures resembling pointed hats, which form a rough surface despite adequate leveling. Rheologically dilatant behavior of the drop can even lead to rebounding of the ejected drop. It is clear to the person skilled in the art from the above that the production of high-quality molded articles is possible only by precisely matching the technical parameters of the print head to the rheological and interfacial properties of the printing material. In the case of the production of moldings starting from silicone compositions by means of ballistic 3D printing methods, there are additionally some complicating marginal conditions. The production of silicone elastomers with good mechanical properties (tear strength, extensibility, tear propagation resistance, etc.) is only possible if a) sufficiently long silicone polymers (that is to say with a sufficiently high degree of polymerization or molecular weight) are used and b) actively reinforcing fillers (pyrogenic or precipitated silicas, carbon blacks, etc.) are at the same time present in the composition. Both of these inevitably result in silicone compositions with high viscosity, which stands in the way of clean drop formation during jetting. The expression "actively reinforcing filler" or, synonymously, "reinforcing filler" is here understood as meaning a filler which improves the mechanical properties of the elastomers in which it is used. By contrast, inactive fillers act as extenders and dilute the elastomer. As the viscosity increases, rapid breaking off of the material thread at the nozzle outlet becomes more difficult, that is to say the main drop remains connected to the nozzle via the material thread for a comparatively long time, while the print head permanently continues to move. On the other hand, as high a surface tension of the material as possible is necessary for the rapid formation of a discrete drop during jetting. Surface tension always causes a minimization of the surface area of a structure, that is to say it strives towards a spherical shape, which can prevent the formation of satellites and splashing, for example. However, the surface tension of silicones is among the lowest in the polymer range (only perfluorinated hydrocarbons have lower surface tensions). While aqueous printing inks nave a high surface tension of about 70 mN/m, the surface tension is only about 20 to 25 mN/m in the case of silicone-based printing materials. A further difficulty in the production of highly transparent silicone moldings is that silicone compositions comprising fillers are generally translucent, which precludes their use in optical applications (e.g. lenses). This shortcoming of filler-reinforced silicone compositions can be avoided by using silicone resins as reinforcing agents. In this manner it is possible to produce highly transparent silicone moldings with sufficient mechanical strength. However, while silicone compositions comprising fillers exhibit a pronounced shear-thinning behavior, so that the jetting thereof becomes possible, silicone compositions reinforced with silicone resins have virtually no shear-thinning behavior. Because of these difficulties, the production of highly transparent silicone moldings by the DOD jetting method was hitherto deemed to be impracticable.

SUMMARY OF THE INVENTION

An object of the present invention was, therefore, to provide crosslinkable silicone compositions which satisfy the requirements in terms of processing properties and processing time for use in ballistic generative methods (3D printing) and which permit the production of highly transparent molded bodies. It has now surprisingly been found that the silicone compositions according to the invention achieve this object since they have particular rheological and interfacial properties and thus permit the production of highly transparent moldings by means of 3D printing by the ballistic DOD method (jetting).

BRIEF DESCRIPTION OF THE DRAWINGS—BILL ADD DESCRIPTION

DETAILED DESCRIPTION OF THE PREFERRED EMBODIMENTS

Figure 1:
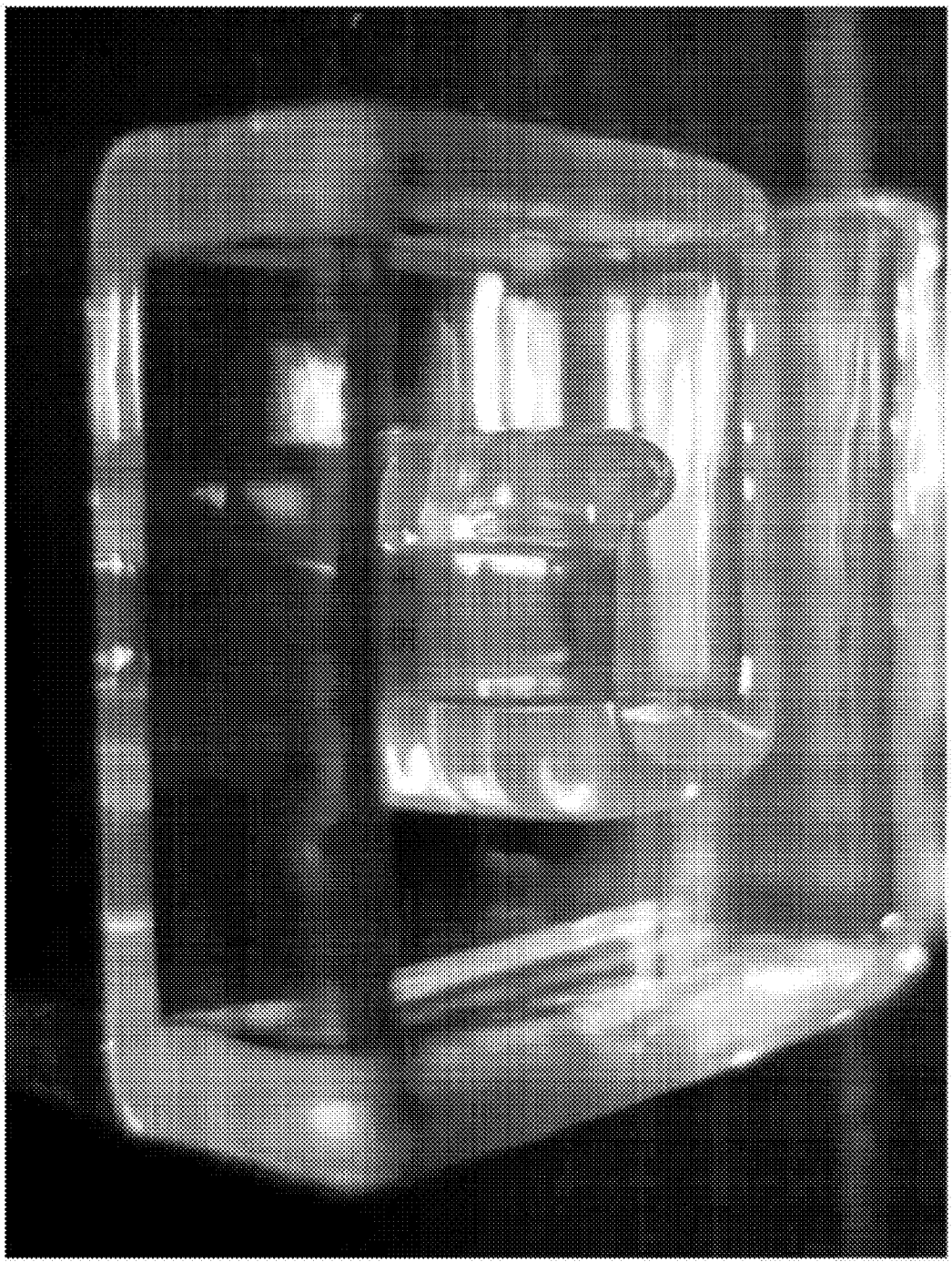
FIG. 1 illustrates a 3D molding produced from one embodiment of a curable silicone 3D printing composition in accordance with the invention.

The crosslinkable silicone compositions according to the invention for the 3D printing of silicone moldings by the ballistic generative DOD method comprise:

(A) from 5 to 99% by weight of an organosilicone resin composed of units of the general formulae $$R_3SiO_{1/2} \quad (I),$$

$$R_2SiO_{2/2} \quad (II),$$

$$RSiO_{3/2} \quad (III) \text{ and}$$

$$SiO_{4/2} \quad (IV),$$

wherein the radicals R may be identical or different and denote an H, HO or any desired optionally substituted radical containing from 1 to 40 carbon atoms, with the proviso that the content of units of formula (III) and (IV) in the silicone resin is at least 5 mol. %, (B) from 0 to 95% by weight of at least one organosilicon compound having, on average, at least two aliphatically unsaturated groups per molecule, with the proviso that its content of T and Q units is less than 5 mol. %, (C) from 0 to 50% by weight of at least one organosilicon compound having, on average, at least two SiH groups per molecule, with the proviso that its content of T and Q units is less than 5 mol. %, or instead of (B) and/or (C) or in addition to (B) and (C)

(D) from 0 to 95% by weight of at least one organosilicon compound having, on average, at least two aliphatically unsaturated groups and at least two SiH groups per molecule, with the proviso that its content of T and Q units is less than 5 mol. %, wherein the amounts of constituents (B), (C) and (D) are so chosen that at least one constituent that contains, on average, at least two aliphatically unsaturated groups per molecule is always present, and at the same time at least one constituent that contains, on average, at least two Si-bonded hydrogen atoms per molecule is present, (E) from 0.1 to 500 ppm by weight of at least one hydrosilylation catalyst, based on the content of the metal to the total silicone composition, (F) from 0.01 to 5% by weight of a rheological agent which contains polar groups and is selected from (F1), (F2) and (F3) and mixtures thereof (F1) epoxy-group-functional compounds,
(F2) (poly)ether-group-functional compounds,
(F3) (poly)ester-group-functional compounds,
wherein the epoxy and ether and ester groups may also be present in a single molecule, (G) from 0 to 30% by weight auxiliary substances other than (A) to (F), characterized in that the relaxation time τ of the silicone composition lies within the following range:

0.01 second<τ≤15 seconds, wherein τ is given by formula (V):

$$\eta(t)=\eta_{max}+(\eta_0-\eta_{max})*EXP(-t/\tau), \quad (V)$$

wherein $\eta(t)$ is the viscosity at time t, $\eta_{max}$ denotes the maximum viscosity achieved within a given time after removal of the shear, $\eta_0$ is the viscosity measured immediately after intense shear (that is to say at time t=0), and EXP denotes the e-function, and characterized in that the nominal flow behavior index n, which quantifies the degree of shear-thinning behavior of the silicone composition, lies within the following range:

−1.00<n<−0.10, wherein n is given by formula (VI):

$$\log \eta = \log K + n*\log v, \quad (VI)$$

wherein

η represents the viscosity at shear rate v,

K represents the nominal flow consistency index, v represents the shear rate, and log represents the decadic logarithm, and the determination of the relaxation time τ according to formula (V), of the nominal flow behavior index n and of the nominal flow consistency index K according to formula (VI) is carried out in accordance with the rheological measuring method disclosed in the description.

The four structural units of the silicones have long been known to the person skilled in the art. The M unit is a monofunctional structural unit at the chain end. The D unit is a difunctional, linear structural unit in chains. The T unit is a trifunctional structural unit which forms branches in three spatial directions. The Q unit is a tetrafunctional structural unit which forms branches in four spatial directions.

The relaxation time x of the silicone composition according to the invention lies preferably in the range of 0.1 second<τ≤12 seconds and more preferably in the range of 1 second<τ≤9 seconds.

Preferably, the nominal flow behavior index n lies in the range of −0.90<n<−0.30, and more preferably in the range of −0.80<n<−0.40.

The nominal flow behavior index n, which characterizes the nature and scope of the shear-thinning behavior, describes for n<0 shear-thinning flow behavior, for n>0 shear-thickening (dilatant) flow behavior, and for n=0 Newtonian flow behavior.

Constituent (A) of the silicone compositions according to the invention is one (or more than one) organosilicone resin(s) composed of units of formulae (I), (II), (III) and (IV), $$R_3SiO_{1/2} \quad (I),$$

$$R_2SiO_{2/2} \quad (II),$$

$$RSiO_{3/2} \quad (III) \text{ and}$$

$$SiO_{4/2} \quad (IV),$$

wherein the radicals R may be identical or different and denote an H, HO or any desired optionally substituted radical containing from 1 to 40 carbon atoms, with the proviso that the content of units of formulae (III) and (IV) in the silicone resin (A) is at least 5 mol. %, preferably at least 10 mol. %, in particular at least 30 mol. %, and preferably not more than 80 mol. %, in particular not more than 70 mol. %.

Particular preference is given to organosilicone resins (A) composed of units of formulae (I) and (IV), which are known to those skilled in the art as "MQ" resins.

Organosilicone resins (A) having Si-bonded hydrogen atoms have a H content of not more than 1.2% by weight, preferably not more than 0.6% by weight, and more preferably not more than 0.3% by weight.

The content of Si-bonded OH groups in the organosilicone resins (A) is not more than 7% by weight, preferably not more than 3% by weight, and in particular not more than 0.5% by weight. The use of low-OH content organosilicone resins is preferred.

The average number-average molecular weight of the organosilicone resins (A) is preferably at least 200 g/mol, in particular at least 1000 g/mol, and preferably not more than 100,000 g/mol, in particular not more than 20,000 g/mol.

The radicals R can be mono- or poly-valent radicals, wherein the polyvalent radicals, such as bivalent, trivalent and tetravalent radicals, then bond together a plurality of siloxy units of formulae (I) to (IV), such as, for example, two, three or four siloxy units of formulae (I) to (IV).

Preferably, the radicals R are bonded to the silicon via a carbon atom or oxygen atom. Examples of SiC-bonded radicals R are alkyl radicals (e.g. methyl, ethyl, octyl and octadecyl radicals), cycloalkyl radicals (e.g. cyclopentyl, cyclohexyl and methylcyclohexyl radicals), aryl radicals (e.g. phenyl and naphthyl radicals), alkaryl radicals (e.g. tolyl and xylyl radicals) and aralkyl radicals (e.g. benzyl and beta-phenylethyl radicals). Examples of substituted radicals R are 3,3,3-trifluoro-n-propyl, p-chlorophenyl, chloromethyl, glycidoxypropyl and —(CH$_2$)$_{n*}$—(OCH$_2$CH$_2$)$_{m*}$—OCH$_3$., wherein n* and m* are identical or different integers between 0 and 10. Particularly preferred radicals R are the methyl and phenyl radicals. Examples of SiO-bonded radicals R are alkoxy groups (e.g. methoxy, ethoxy, isopropoxy and tert-butoxy radicals) and the p-nitrophenoxy radical.

The radical R can be any desired alkenyl and alkynyl groups having from 2 to 16 carbon atoms, such as the vinyl, allyl, methallyl, 1-propenyl, 5-hexenyl, ethynyl, butadienyl, hexadienyl, undecenyl, cyclopentenyl, cyclopentadienyl, norbornenyl and styryl radicals, wherein vinyl, allyl and hexenyl radicals are particularly preferred.

The radical R can be a substituted aliphatically unsaturated group, for example the allyloxypropyl, isopropenyloxy, 3-acryloxypropyl, 2-acryloxyethoxy, acryloxymethyl, acryloxy, methacryloxy, methacryloxyethoxy and methacryloxypropyl radicals.

The organosilicone resin (A) can contain Si-bonded H atoms and aliphatically unsaturated groups at the same time and is thus capable of the crosslinking reaction in the presence of a hydrosilylation catalyst without further additives such as (B) and (C) or (D) being required. The same is true when a mixture consisting of an Si-bonded organosilicone resin (A) containing H atoms and an organosilicone resin (A) containing aliphatically unsaturated groups is used. Such silicone resin compositions are suitable in particular for the production of very hard, highly transparent moldings.

If the moldings are to have the property profile of a silicone elastomer, the additional use of constituents (B) and (C) is recommended. In this case, the organosilicone resin (A) acts as a reinforcing agent, in order to achieve sufficient mechanical strength of the crosslinked silicone composition without having to accept the high viscosity and turbidity which occur when actively reinforcing fillers are used. Mechanical strength is hereby understood as meaning the totality of the properties that are typical of crosslinked silicones, in particular hardness, elongation at break, tear strength and tear propagation resistance.

The content of constituent (A) in the silicone composition according to the invention is between 5 and 99% by weight, preferably between 10 and 60% by weight, and most preferably between 20 and 50% by weight.

Constituent (B) of the silicone composition according to the invention is an organosilicon compound having at least two aliphatic carbon-carbon multiple bonds, the total content of T and Q units of which is less than 5 mol. %, preferably less than 1 mol. %, and most preferably less than 0.5 mol. %. (B) is composed of units of formula (VII):

(VII), wherein
R$^1$ may be identical or different and denotes an optionally halo-substituted C$_1$-C$_{20}$ radical that is free of aliphatic carbon-carbon multiple bonds and optionally contains O, N, S or P atoms, or denotes an OH radical,
R$^2$ may be identical or different and denotes a monovalent, optionally substituted organic radical having an aliphatic carbon-carbon multiple bond,
a is 0, 1, 2 or 3, and
b is 0, 1 or 2,
with the proviso that a+b is <4, at least 2 radicals R$^1$ are present per molecule, and the total content of T and Q units, that is to say units of formula (VII) for which a=0 and b=0, a=1 and b=0, a=0 and b=1, is less than 5 mol. %, preferably less than 1 mol. %, and most preferably less than 0.5 mol. %.

Preferably, the radicals R$^1$ are bonded to the silicon via a carbon atom or oxygen atom. Examples of SiC-bonded radicals R$^1$ are alkyl radicals (e.g. methyl, ethyl, octyl and octadecyl radicals), cycloalkyl radicals (e.g. cyclopentyl, cyclohexyl and methylcyclohexyl radicals), aryl radicals (e.g. phenyl and naphthyl radicals), alkaryl radicals (e.g. tolyl and xylyl radical) and aralkyl radicals (e.g. benzyl and beta-phenylethyl radicals). Examples of substituted radicals R$^1$ are 3,3,3-trifluoro-n-propyl, p-chlorophenyl, chloromethyl, glycidoxypropyl and —(CH$_2$)$_{n}$—(OCH$_2$CH$_2$)$_{m}$—OCH$_3$, wherein n and m are identical or different integers between 0 and 10. Examples of SiO-bonded radicals R$^1$ are alkoxy groups (e.g. methoxy, ethoxy, isopropoxy and tert.-butoxy radicals) and the p-nitrophenoxy radical. Particularly preferred radicals R$^1$ are the methyl and phenyl radicals.

The radical R$^2$ can be any desired groups that are amenable to an addition reaction (hydrosilylation) with an SiH-functional compound. The radicals R$^2$ are preferably alkenyl or alkynyl groups having from 2 to 16 carbon atoms, such as vinyl, allyl, methallyl, 1-propenyl, 5-hexenyl, ethynyl, butadienyl, hexadienyl, undecenyl, cyclopentenyl, cyclopentadienyl, norbornenyl and styryl radicals, wherein vinyl, allyl and hexenyl radicals are particularly preferred.

The radicals R$^2$ can also be substituted unsaturated radicals, for example allyloxypropyl, isopropenyloxy, 3-acryloxypropyl, 2-acryloxyethoxy, acryloxymethyl, acryloxy, methacryloxy, methacryloxyethoxy and methacryloxypropyl radicals.

The radicals R$^1$ and R$^2$ can be mono- or poly-valent radicals, wherein the polyvalent radicals, such as divalent, trivalent and tetravalent radicals, then bond together a plurality of siloxy units of formula (VII), such as, for example, two, three or four siloxy units of formula (VII).

Preferably used as constituent (B) are vinyl-functional, linear or cyclic polyorganosiloxanes having a viscosity of from 10 to 500,000 mPa·s, more preferably between 100 and 50,000 mPa·s (at 25° C. and 0.8 sec$^{-1}$). Particular preference is given to vinyl-functional, substantially linear polydiorganosiloxanes. Constituent (B) can be a mixture of different organosilicon compounds of the above-described type.

The content of constituent (B) in the silicone composition according to the invention is from 0 to 95% by weight, preferably from 30 to 80% by weight, and most preferably from 30 to 60% by weight.

Constituent (C) is any desired SiH-functional organosilicon compound having, on average, at least two SiH groups per molecule, which is free of aliphatically unsaturated groups. Its total content of T and Q units is less than 5 mol. %, preferably less than 1 mol. %, and most preferably less than 0.5 mol. %. Constituent (C) acts as the crosslinker for the silicone composition. Constituent (C) can also be a mixture of different SiH-functional organosilicon compounds. Preferably, constituents (C) are linear or cyclic polyorganosiloxanes having Si-bonded hydrogen atoms, which are composed of units of formula (VIII)

$$R^1_c H_d SiO_{(4-c-d)/2} \quad (VIII)$$

wherein
R$^1$ may be identical or different and have the meaning given above,
c is 1, 2 or 3, and
d is 0, 1 or 2,
with the proviso that the sum of (c+d) is less than or equal to 3, on average at least two Si-bonded hydrogen atoms are present per molecule, and the total content of T and Q units, that is to say units of formula (VIII) for which c=0 and d=0, c=1 and d=0, c=0 and d=1, is less than 5 mol. %, preferably less than 1 mol. %, and most preferably less than 0.5 mol. %.

Preferably, constituent (C) contains Si-bonded hydrogen in the range of from 0.04 to 1.7% by weight, based on the total weight of the organopolysiloxane (C). The number-average molecular weight of constituent (C) can vary within wide limits, for example between $10^2$ and $10^6$ g/mol. Constituent (C) can thus be, for example, a relatively low molecular weight SiH-functional oligosiloxane, such as tetramethyldisiloxane, but also a high-polymer polydimethylsiloxane having SiH groups in the chain and/or terminal SiH groups. Preference is given to the use of low molecular weight SiH-functional compounds, such as tetramethylcyclotetrasiloxane, SiH-containing siloxanes such as poly(hydrogenmethyl)siloxane and poly(dimethylhydrogen-methyl) siloxane, having a viscosity of from 10 to 1000 mPa·s (at 25° C. and 0.8 sec$^{-1}$). Preference is given to constituents (C) that are compatible (homogeneously miscible or at least emulsifiable) with constituents (A) and (B). Depending on the nature of constituents (A) and (B), it may therefore be necessary to substitute constituent (C) in a suitable manner, for example by replacing some of the methyl groups by 3,3,3-trifluoropropyl groups or phenyl groups.

Constituent (C) can be used on its own or in the form of a mixture of at least two different constituents (C) and is preferably present in the silicone composition according to the invention in an amount such that the molar ratio of SiH groups to aliphatically unsaturated groups is from 0.1 to 20, preferably between 0.5 and 5, and most preferably between 1 and 2. The content of constituent (C) in the silicone composition according to the invention is from 0 to 50% by weight, preferably from 0.5 to 30% by weight, and most preferably from 2 to 15% by weight.

Constituent (D) can be used instead of (B) and/or (C) or in addition to (B) and (C). The following combinations are thus possible in the addition-crosslinkable compositions according to the invention; (B)+(C) or (B)+(D) or (C)+(D) or (B)+(C)+(D) or (D) on its own. (D) is an organosilicon compound having at least two aliphatically unsaturated groups and at least two SiH groups per molecule and can thus crosslink with itself, with the proviso that the content of T and Q units is less than 5 mol. %, preferably less than 1 mol. %, and most preferably less than 0.5 mol. %. Compounds (D) are generally known to the person skilled in the art from the prior art. If compounds (D) are used, they are preferably those that are composed of units of the general formulae $$R^1_k SiO_{(4-k)/2} \quad (XI),$$

$$R^1_m R^2 SiO_{(3-m)/2} \quad (X) \text{ and}$$

$$R^1_o HSiO_{(3-o)/2} \quad (XI),$$

wherein
R$^1$ and R$^2$ have the meaning given above, and
k denotes 0, 1, 2 or 3,
m denotes 0, 1 or 2,
o denotes 0, 1 or 2,
with the proviso that, on average, at least 2 radicals R$^1$ and, on average, at least 2 Si-bonded hydrogen atoms are present, and the total content of T and Q units, that is to say units of formula (IX), (X) and (XI) for which k=0, k=1, m=0, o=0, is less than 5 mol. %, preferably less than 1 mol. %, and most preferably less than 0.5 mol. %.

The compounds (D) are preferably linear or cyclic. A single compound (D) or a mixture of at least two compounds (D) can be used.

The content of constituent (D) in the silicone composition according to the invention is from 0 to 95% by weight.

Constituent (E) serves as the catalyst for the addition reaction (hydrosilylation) between the aliphatically unsaturated groups of constituents (A), (B) and (D) (where present) and the silicon-bonded hydrogen atoms of constituents (A), (C) and (D) (where present). In principle, any hydrosilylation catalysts conventionally employed in addition-crosslinking silicone compositions can be used. Catalysts (E) that promote the addition of Si-bonded hydrogen to aliphatic multiple bond are, for example, platinum, rhodium, ruthenium, palladium, osmium or iridium, and organometallic compounds and combinations thereof. Examples of such catalysts (E) are metallic and finely divided platinum, which can be on supports such as silicon dioxide, aluminum oxide or activated carbon, compounds or complexes of platinum, such as platinum halides, for example PtCl$_4$, H$_2$PtCl$_6$·6H$_2$O, Na$_2$PtCl$_4$·4H$_2$O, platinum acetylacetonate and complexes of said compounds which are encapsulated in a matrix or a core/shell-like structure. Platinum-olefin complexes, platinum-phosphite complexes, platinum-alcohol complexes, platinum-alcoholate complexes, platinum-ether complexes, platinum-aldehyde complexes, platinum-ketone complexes, including reaction products of H$_2$PtCl$_6$·6H$_2$O and cyclohexanone, platinum-vinyl-siloxane complexes, such as platinum-1,3-divinyl-1,1,3,3-tetra-methyl-disilazane complexes with or without a content of detectable inorganically bonded halogen, bis-(gamma-picoline)-platinum dichloride, trimethylenedipyridineplatinum dichloride, dicyclopentadiene platinum dichloride, dimethylsulfoxide-ethylene-platinum (II) dichloride, cyclooctadiene-platinum dichloride, norbornadiene-platinum dichloride, gamma-picoline-platinum dichloride, cycloperytadiene-platinum dichloride, and also reaction products of platinum tetrachloride with olefin and primary amine or secondary amine or primary and secondary amine, such as the reaction product of platinum tetrachloride, dissolved in 1-octene, with sec.-butylamine or ammonium-platinum complexes, trimethyl-cyclopentadienyl-platinum (IV), trimethyl[(3-trimethoxysilyl)propyl-cyclopentadienyl]-platinum(IV).

The listed hydrosilylation catalysts generally permit rapid crosslinking of the silicone composition even at room temperature. Since the hydrosilylation reaction begins as soon as all the constituents have been mixed, addition-crosslinking compositions are mostly formulated in the form of at least two components, wherein a component A contains the platinum catalyst (E) and another component B contains the constituents having Si-bonded hydrogen atoms, such as the crosslinker (C) (optionally (A) or (D)). However, by using special hydrosilylation catalysts it is also possible to formulate one-component silicone compositions. In order to have sufficient processing time available even after the two components have been mixed, in most cases inhibitors are added, which delay the onset of the crosslinking reaction. Rapid crosslinking can then be brought about by supplying heat. However, for the use of addition-crosslinking compositions in the 3D printing method, preference is given to those hydrosilylation catalysts that are poorly activatable thermally but can very easily be activated by means of high-energy radiation (UV, UV-VIS), that is to say crosslinking of the deposited silicone composition is initiated not thermally but preferably by means of UV or UV-VIS radiation. This takes place, for example, either via an activatable hydrosilylation catalyst (E) or via a deactivatable inhibitor (G) that is additionally present. Crosslinking induced by UV or UV-VIS has numerous advantages over thermal crosslinking. On the one hand, the intensity, the action time and the site of action of the UV radiation can be measured precisely, while heating of the silicone composition deposited dropwise (and also the subsequent cooling thereof) always takes place in a delayed manner owing to the relatively low thermal conductivity. Because of the intrinsically very high thermal expansion coefficient of the silicones, the temperature gradients necessarily present during thermal crosslinking lead to mechanical stresses which adversely affect the dimensional accuracy of the molding that is formed, which in extreme cases can result in unacceptable shape distortion. A further advantage of UV/VIS-induced addition crosslinking manifests itself in the production of multicomponent moldings, such as, for example, hard-soft composites, which, as well as comprising the silicone elastomer, also comprise a thermoplastic, heat-related warping of which is avoided.

UV/VIS-induced addition-crosslinking silicone compositions are known to the person skilled in the art and are described, for example, in DE 10 2008 000 156 A1, DE 10 2008 043 316 A1, DE 10 2009 002 231 A1, DE 10 2009 027 486 A1, DE 10 2010 043 149 A1 and WO 2009/027133 A2. Crosslinking occurs by UV/VIS-induced activation of a light-sensitive hydrosilylation catalyst (E), whereby complexes of platinum are preferred. A large number of light-activatable platinum catalysts are described in the specialist literature, which are largely inactive with the exclusion of light and can be converted into platinum catalysts that are active at room temperature by irradiation with light having a wavelength of from 250 to 500 nm. Examples thereof which have long been known to the person skilled in the art are ($\eta$-diolefin) ($\sigma$-aryl)-platinum complexes (EP 0 122 008 A1; EP 0 561 919 B1), Pt(II)-$\beta$-diketonate complexes (EP 0 398 701 B1) and ($\eta^5$-cyclopentadienyl) tri ($\sigma$-alkyl)platinum(IV) complexes (EP 0 146 307 B1, EP 0 358 452 B1, EP 0 561 893 B1). Particular preference is given to MeCpPtMe$_3$ and the complexes derived therefrom by substitution of the groups located on the platinum, as described, for example, in EP 1 050 538 B1 and EP 1 803 728 B1.

The compositions which crosslink with UV or UV-VIS induction can be formulated in one- or multi-component form.

The speed of the UV-VIS-induced addition crosslinking depends on a large number of factors, in particular on the nature and concentration of the platinum catalyst, on the intensity, wavelength and action time of the UV-VIS radiation, on the transparency, reflectivity, layer thickness and composition of the silicone composition, and on the temperature. Light having a wavelength of from 240 to 500 nm, preferably from 300 to 450 nm, most preferably from 350 to 400 nm, is used for activating the UV/VIS-induced addition-crosslinking silicone composition. In order to achieve rapid crosslinking, which is to be understood as meaning a crosslinking time at room temperature of less than 20 minutes, preferably less than 10 minutes, and most preferably less than 1 minute, it is recommended to use a UV/VIS radiation source having a power of between 10 mW/cm$^2$ and 15,000 mW/cm$^2$, and a radiation dose of between 150 mJ/cm$^2$ and 20,000 mJ/cm$^2$, preferably between 500 mJ/cm$^2$ and 10,000 mJ/cm$^2$. Within the context of these power and dose values, area-related irradiation times between a maximum of 2000 s/cm$^2$ and a minimum of 8 ms/cm$^2$ can be achieved. A plurality of radiation sources, and also different radiation sources, can be used.

The hydrosilylation catalyst (E) should preferably be used in a catalytically sufficient amount, so that sufficiently rapid crosslinking at room temperature is possible. Typically, from 0.1 to 500 ppm by weight of the catalyst are used, based on the content of the metal to the total silicone composition, preferably from 0.5 to 200 ppm by weight, and most preferably from 1 to 50 ppm by weight. Mixtures of different hydrosilylation catalysts (E) can also be used.

Constituent (F) of the silicone composition according to the invention is a rheological agent, which serves to adjust the Shear-thinning and thixotropic behavior. Shear-thinning behavior is here understood as meaning the fall in viscosity as the shear rate increases. Thixotropic behavior is the degree and the rapidity of the viscosity recovery, with which the material attempts to return to the initial viscosity state after the shear is removed. Shear-thinning behavior is caused especially by at least partially reversible structural changes in the material as a result of shear forces. For example, physical particle-particle networks can be broken up by shear forces, as a result of which the polymer previously immobilized in the network becomes flowable and the viscosity of the material fails. In the rest state, this network can often be re-formed (thixotropic behavior).

Constituent (F) is of critical importance in the ballistic deposition of silicone compositions for a high-quality printed image.

Constituent (F) effects a sufficiently rapid viscosity build-up of the deposited droplet and thereby prevents excessive spreading and splashing. In addition, constituent (F) generates a flow limit, whereby the deposited silicone composition acquires sufficient green strength to permit the printing of fine structural details and, to a certain extent, makes the additional deposition of support structures unnecessary. Despite the viscosity increase effected by constituent (F), the compositions according to the invention comprising constituent (F) can be jetted without difficulty and result in a clean printed image. The former owing to the shear-thinning action of (F), the latter owing to the shortened relaxation time of the jetted droplet due to (F).

The effectiveness of the rheological agent (F) is bound to the presence of the silicone resin (A) in the silicone composition, since only by the combination thereof does the composition according to the invention acquire properties which permit its use for the 3D printing of silicone moldings by the ballistic generative DOD method.

The effect of constituent (F) in the silicone composition according to the invention can be characterized and quantified by means of two rheological parameters, the so-called relaxation time $\tau$ (SI unit: s) and the nominal flow behavior index n (dimensionless). The relaxation time $\tau$ is given by formula (V);

$$\eta(t)=\eta_{max}+(\eta_0-\eta_{max})*\text{EXP}(-t/\tau), \tag{V}$$

wherein $\eta(t)$ is the viscosity (SI unit: Pa·s) at time t (SI unit: s), $\eta_{max}$ (SI unit: Pa·s) denotes the maximum viscosity achieved within a given time after removal of the shear,
$\eta_0$ (SI unit: Pa·s) is the viscosity measured immediately after intense shear (that is to say at time t=0), and
EXP denotes the e-function,
wherein the determination of the relaxation time τ is carried out in accordance with the rheological measuring method disclosed in the description.

The relaxation time τ so defined describes how quickly the viscosity of an intensively sheared composition recovers when the shear is removed. Large τ values mean a slow viscosity recovery, small values mean rapid relaxation. In extensive tests on different silicone compositions it has been found that only those silicone-resin-reinforced compositions whose relaxation time τ is not more than 15 seconds, preferably a maximum of 12 seconds, more preferably a maximum of 9 seconds, result in a printed image that is clean and thus in accordance with the invention. It is found that silicone compositions with relaxation times τ>15 seconds that are not in accordance with the invention always result in an unclean printed image (e.g. inadequate edge sharpness, blurred structural details, etc.). In the case of silicone-resin-reinforced (filler-free) silicone compositions, however, the relaxation time alone is not a sufficient criterion for processability by the DOD method, namely because the reconstruction of the viscosity observed after jetting can only occur if there was a sufficient fall in the viscosity previously (under shear), that is to say if there was sufficient, shear-thinning behavior. The latter is described by the nominal flow behavior index n. If the value thereof is too small, the fall in viscosity under shear is insufficient and consequently, when the shear is removed, the structure build-up is also not significant, which has the result that indicating the relaxation time for such compositions is meaningless. The viscosity increase after shear observed in the case of (F)-free silicone compositions takes place almost immediately and is caused by a relaxation of the polymer chains, which were stretched under shear, to their equilibrium configuration. The (F)-containing silicone compositions according to the invention, on the other hand, exhibit a viscosity increase through structure build-up as a result of the stronger intermolecular interactions imparted by (F), that is to say a sufficient shear-thinning behavior, which is expressed in relaxation times τ of at least 0.01 second, preferably at least 0.1 second and more preferably at least 1 second.

The nominal flow behavior index n, which characterizes the degree of shear-thinning behavior, is given by formula (VI)

$$\log \eta = \log K + n^* \log v, \qquad (VI)$$

wherein
η represents the viscosity (SI unit: Pa·s) at shear rate v (SI unit: s$^{-1}$),
K represents the nominal flow consistency index (SI unit: Pa·s$^{n+1}$),
v represents the shear rate (SI unit: s$^{-1}$), and
log represents the decadic logarithm,
and the determination of n and K is carried out in accordance with the rheological measuring method disclosed in the description.

In extensive tests on different silicone-resin-reinforced silicone compositions it was found that only those compositions whose nominal flow behavior index n satisfies the relationship −1.00<n<−0,10, preferably −0.90<n<−0.30, and most preferably −0.80<n<−0.40, lead to a clean printed image. Silicone compositions whose nominal flow behavior index n is less than −1.00 or greater than −0.10, which are not in accordance with the invention, lead to an unclean printed image (e.g. inadequate edge sharpness, blurred structural details, etc.). Only when both the nominal flow behavior index n and the relaxation time τ of the silicone-resin-reinforced composition lie within the range according to the invention is it possible to produce high-quality moldings by means of ballistic DOD methods.

Rheological additives (F) according to the invention are preferably selected from the following group
(F1) epoxy-group-functional compounds,
(F2) (poly)ether-group-functional compounds, and
(F3) (poly)ester-group-functional compounds,
wherein the epoxy and ether and ester groups may also be present in a single molecule. The expression "functional" refers to a stronger interaction between the group in question from (F) and especially constituent (A) compared with the interaction between (F) and the silicone constituents (B), (C) and (D). This stronger interaction includes especially hydrogen bridge interactions, dispersion interactions and polar interactions of the Debye and Keesom type. The increased interaction of (F) with (A) effects the formation of physical (A)-(F)-(A) bridges, which leads to a network-like structuring of the silicone composition, which reduces the flowability of the other silicone constituents (B), (C) and (D) (flow limit, high resting viscosity). Under the action of shear, this network is destructured, which is recognizable by pronounced shear thinning. After the shear is removed, the stronger interaction of the rheological agent (F) with (A) effects the rapid (but not immediate) reconstruction of the network structure, accompanied by a viscosity increase and the formation of a flow limit.

Constituent (F1) can be any desired organic or organosilicon compound having at least one epoxy group and is preferably used. Epoxy-functional organic compounds (F1) are particularly preferred. Examples of organic epoxy-functional compounds (F1) are 1,2-epoxypropanol, vinylcyclohexene monoxide, dodecanol glycidyl ether, butyl glycidyl ether, p-tert.-butylphenyl glycidyl ether, 2-ethylhexyl glycidyl ether, glycidyl methacrylate, dicyclopentadiene dioxide, vinylcyclohexene dioxide, butanediol diglycidyl ether, neopentyl glycol diglycidyl ether, 1,6-hexanediol diglycidyl ether, polypropylene glycol diglycidyl ether, trimethylolpropane triglycidyl ether, 3,4-epoxycyclohexylmethyl-3',4'-epoxycyclohexane carboxylate. Constituent (F1) can be an epoxidized vegetable oil or a vegetable oil containing epoxy groups, such as epoxidized rapeseed oil, sunflower oil, linseed oil, soybean oil, palm oil, crambe oil, castor oil and vernonia oil, or an epoxidized fatty acid, such as epoxidized oleic acid, petroselinic acid, erucic acid, linoleic acid, linolenic acid, ricinoleic acid, calendic acid, vernolic acid and santalbinic acid.

Preferred constituents (F1) are organosilicon epoxy-functional compounds composed of units of formula (XII)

(XII), wherein R may be identical or different and has the meaning given hereinbefore for formula (I) to (IV),
$R^3$ is an optionally halo-substituted, monovalent hydrocarbon radical having from 2 to 20 carbon atoms containing at least one epoxy group CH2(—O—)CH— or —CH(—O—)CH— and optionally containing O, N, S or P atoms, with the proviso that
e is 0, 1, 2 or 3,
f is 0, 1, 2, 3 or 4,
and (e+f) is <5.

Examples thereof are epoxy-functional silanes such as 2-(3,4-epoxycyclohexyl)ethyltriethoxysilane, 2-(3,4-epoxycyclohexyl)-ethyltrimethoxysilane, (3-glycidoxypropyl) trimethoxysilane, (3-glycidoxypropyl)triethoxysilane, 5,6-epoxyhexyltriethoxysilane, (3-glycidoxypropyl) methyldimethoxysilane, (3-glycidoxypropyl)-methyldiethoxysilane, (3-glycidoxypropyl) dimethylethoxysilane and tris (glycidoxypropyldimethylsiloxy)phenylsilane. Further examples of organosilicon compounds (F1) are epoxy-functional siloxanes such as bis(2-(3,4-epoxycyclohexyl)ethyl) tetramethyldisiloxane, 1,5-bis(glycidoxypropyl)-3-phenyl-1,1,3,5,5-pentamethyitrisiloxane, (3-glycidoxypropyl)bis (trimethylsiloxy)silane, (3-glycidoxypropyl) pentamethyldisiloxane, 1,3-bis(glycidoxypropyl) tetramethyldisiloxane, glycidoxypropyl-tetramethylcyclotetrasiloxane, glycidoxypropyl-trimethoxy-silylethyl-pentamethylcyclopentasiloxane, glycidoxypropyl-terminated polydimethylsiloxanes, epoxy-cyclohexylethyl-terminated polydimethylsiloxanes, copolymeric poly(epoxycyclohexylethylmethyl-dimethyl)siloxanes and copolymeric poly(epoxycyclohexylethylmethyl-dimethyl-polyalkyleneoxypropylmethyl)-siloxanes.

Constituent (F2) is a polyether-functional organic or organosilicon compound (or a mixture of a plurality of such compounds). Preference is given to polyalkylene glycols of the general formula (XIII)

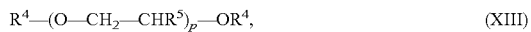

$$R^4-(O-CH_2-CHR^5)_p-OR^4, \quad (XIII)$$

wherein the radicals
$R^4$ may be identical or different and represent an optionally halo-substituted, monovalent, saturated or unsaturated $C_1$-$C_{20}$-hydrocarbon radical optionally containing O, S, N or P atoms, a hydrogen atom, or a monovalent organosilicon radical, consisting of units of formulae (I) to (IV),
the radicals $R^5$ may be identical or different and are a hydrogen atom or a $C_1$-$C_4$-hydrocarbon radical, preferably a hydrogen atom or a methyl radical,
p is an integer from 1 to 1000, preferably from 1 to 500 and more preferably 5-100.

Preference is given to polyalkylene glycols having a melting point of less than 100° C., preferably less than 50° C., and particular preference is given to polyalkylene glycols that are liquid at room temperature. The number-average molecular weight of preferred polyalkylene glycols is between 200 and 10,000 g/mol.

Preference is given to polyethylene glycols having a number-average molecular weight of 200 g/mol (PEG 200), about 400 g/mol (PEG 400), about 600 g/mol (PEG 600), and about 1000 g/mol (PEG 1000).

Preference is given to polypropylene glycols having a number-average molecular weight of about 425 g/mol, about 725 g/mol, about 1000 g/mol, about 2000 g/mol, about 2700 g/mol, and about 3500 g/mol.

Preference is given to block copolymers of polyethylene glycol (PEG) and polypropylene glycol (PPG) of the PEG-PPG and PEG-PPG-PEG type, e.g. poly(ethylene glycol)-block-poly(propylene glycol)-block-poly(ethylene glycol), preferably having a PEG content of >10% by weight, more preferably having a PEG content of >30% by weight.

Preference is given to polyalkylene-glycol-functional silanes and siloxanes. Examples of silanes are bis((3-methyldimethoxy-silyl)propyl)polypropylene oxide, 1,3-(bis(3-triethoxysilyl-propyl)polyethyleneoxy)-2-methylenepropane, bis(3-triethoxy-silylpropyl)polyethylene oxide with 25-30 EO units, 2-(methoxy(polyethyleneoxy)$_{6-9}$propyl)dimethylmethoxysilane, 2-(methoxy(polyethyleneoxy)$_{6-9}$propyl)trimethoxysilane, methoxy-triethyleneoxyundecyltrimethoxysilane and bis(3-(trimethoxysilylpropyl)-2-hydroxypropoxy)polyethylene oxide. Examples of polyalkylene-glycol-functional siloxanes are block and graft copolymers consisting of dimethylsiloxane units and ethylene glycol units.

Constituent (F3) is a polyester-functional compound (or a mixture of a plurality of such compounds) or a carbonic-acid-ester-functional compound (or a mixture of a plurality of such compounds), which can be liquid, amorphous or crystalline. The compounds may be linear or branched.

Preference is given to polyester-functional or carbonic-acid-ester-functional compounds having a melting point below 100° C., preferably below 50° C., and particular preference is given to polyester-functional or carbonic-acid-ester-functional compounds that are liquid at room temperature.

The number-average molecular weight of preferred polyester-functional or carbonic-acid-ester-functional compounds is between 200 and 2500 g/mol.

Liquid compounds are preferred. Mixtures of a plurality of compounds from both compound classes are also possible. Suitable polyester-functional compounds are, for example, polyester polyols which can be prepared, for example, from dicarboxylic acids having from 2 to 12 carbon atoms, preferably from 4 to 6 carbon atoms, and polyhydric alcohols. OH-functional polyesters are generally known to the person skilled in the art and they are available commercially. Polyester polyols containing two or three terminal OH groups are particularly suitable.

Condensation products of ω-hydroxycarboxylic acids such as, for example, ω-hydroxycaproic acid and preferably polymerization products of lactones, for example optionally substituted ω-caprolactones, can further also be used.

Suitable carbonic-acid-ester-functional compounds are, for example, polycarbonate polyols and polycarbonate polyester polyols.

Block copolymers of the mentioned compound classes and mixtures of the above-mentioned compounds can also be used.

Examples of Polyhydric Alcohols

Examples of polyhydric alcohols are glycols having from 2 to 10, preferably from 2 to 6 carbon atoms, such as, for example, ethylene glycol, diethylene glycol, polyethylene glycol, dipropylene glycol, polypropylene glycol, dibutylene glycol and polybutylene glycol, 1,4-butanediol, 1,5-pentanediol, 1,6-hexanediol, 1,10-decanediol, 2,2-dimethyl-1,3-propanediol, 2-methyl-1,3-propanediol, 1,3-propanediol and dipropylene glycol, 1,4-hydroxymethylcyclohexane, 1,2,4-butanetriol, triethylene glycol, and tetraethylene glycol.

Depending on the desired properties, the polyhydric alcohols can be used alone or optionally in a mixture with one another.

Examples of Dicarboxylic Acids

There come into consideration as dicarboxylic acids, for example:
aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a succinic, glutaric and adipic acid mixture.

Examples of Carbonic Acid Derivatives

Suitable are esters of carbonic acid with the above-mentioned polyhydric alcohols/diols, in particular those having from 4 to 6 carbon atoms, such as 1,4-butanediol and/or 1,6-hexanediol.

Examples of Polyester Diols

As polyester diols there are preferably used ethanediol polyadipates, 1,4-butanediol polyadipates, ethanediol-1,4-butanediol polyadipates, 1,6-hexanediol neopentyl glycol polyadipates, 1,6-hexanediol-1,4-butanediol polyadipates and polycaprolactones.

The content of (F) in the silicone composition according to the invention is from 0.01 to 5.00% by weight, preferably from 0.05 to 3.00% by weight, and most preferably from 0.10 to 2.00% by weight.

Preferably (A) is used in combination with (F1).

Constituent (G) is known to the person skilled in the art and includes all optional additives which may be present in the silicone composition according to the invention in order to achieve special property profiles. They include inhibitors, heat stabilizers, solvents, plasticizers, coloring pigments, sensitizers, photoinitiators, adhesion promoters, fillers, conductivity additives, etc.

The content of constituent (G) in the silicone composition according to the invention is from 0 to 30% by weight, preferably from 0 to 10% by weight, and most preferably from 0 to 5% by weight.

It will be explained in the following how the relaxation time $\tau$ and the nominal flow behavior index n, which are of crucial importance for the processing of highly transparent silicone compositions by the DOD 3D printing method, can purposively be adjusted.

The purpose of the silicone resins listed as constituent (A) is substantially to bring about the mechanical strength of the silicone moldings without adversely affecting their transparency, that is to say they act as reinforcing agents. Other conventional reinforcing agents such as, for example, highly dispersed silicas or other known reinforcing fillers result in translucent moldings and are therefore not suitable for the production of highly transparent silicone moldings. In comparison with these reinforcing fillers that are conventionally used (e.g. highly dispersed silicas), the reinforcing action of the silicone resins is relatively low, however, and bound to the presence of crosslinkable groups (e.g. vinyl groups). In general, higher contents of silicone resins must therefore be chosen in order to achieve adequate mechanical properties.

While the materials conventionally used in the inkjet printing method have very low viscosities (typically <<100 mPa·s), the silicone-resin-containing silicone compositions claimed herein represent comparatively high viscosity materials (typically >>1000 mPa·s). This difference in viscosity means that although droplet sizes in the pl range (picoliter=$10^{-12}$ liters) can be produced with the very low viscosity materials, this is not possible with the silicone compositions according to the invention, the droplet volumes of which are typically larger, namely in the nl range (nanoliter=$10^{-9}$ l).

In order nevertheless to be able to construct moldings with fine details using these relatively large droplets, the silicone compositions must satisfy substantially two marginal conditions: firstly, there must be a sufficiently rapid viscosity increase and the formation of a flow limit immediately after jetting. This property is characterized by the relaxation time $\tau$. Secondly, the silicone composition must have sufficiently strong shear-thinning behavior to permit the jetting of fine droplets. This property is characterized by the nominal flow behavior index n.

Adjustment of the Relaxation Time $\tau$:

When the shear speed of a liquid increases, three different behaviors can in principle be distinguished: viscosity increase (dilatant behavior), viscosity decrease (shear-thinning behavior) and unchanged viscosity (Newtonian behavior). Silicones exhibit Newtonian behavior over a wide range of shear speeds; a viscosity decrease occurs only at very high shear speeds.

Owing to the very weak intermolecular interactions between the silicone polymer chains, there is additionally no flow limit, that is to say even only very weak shear forces cause the silicones to flow. However, it is important for the DOD 3D printing method that the jetted droplets do not spread excessively after they have been deposited, since this would prevent fine structural details of the molding that is to be produced (e.g. edges, points, etc.) from being printed. The silicone composition must therefore have a flow limit which is built up sufficiently quickly immediately after the droplet has been deposited.

Silicone-resin-based silicone compositions exhibit no or only a weakly pronounced flow limit. This has the result that the droplets deposited in the jetting method exhibit excessive Spreading and merging. Under unfavorable conditions, the droplets striking the working surface may even form splashes, an effect which is known in the specialist literature as "splash." Silicone-resin-based silicone compositions must therefore be so formulated with additives such that, following jetting, they exhibit a sufficiently rapid viscosity recovery and formation of a flow limit.

The speed with which this viscosity increase and thus the formation of a flow limit takes place is characterized by the relaxation time $\tau$. Short relaxation times correspond to a rapid viscosity increase and a rapid structure build-up. This structure build-up takes place by the constituent (F) of the silicone compositions according to the invention in conjunction with the silicone resin (A). Although the silicone resin (A) already has a higher polarity and surface energy than the silicone constituents (B) and (C), which are less polar and have a very low surface energy, the resulting incompatibility of the silicone resin with the silicone matrix is too low to build up a sufficiently stable silicone resin network structure. The rheological agent (F), on the other hand, has a significantly higher polarity and surface energy than the constituents (A), (B) and (C), which has the result that the rheological agent (F) increases the polarity and surface energy of the silicone resin (A) through interaction with the silicone resin (A), so that the silicone resin (A), as a result of the increased incompatibility with the other silicone constituents (B) and (C), builds up a network based on physical interactions—and thus a flow limit.

The speed with which this network is built up depends significantly on the degree of incompatibility between the silicone resin modified by the rheological additive and the other silicone constituents: the higher the degree of incompatibility, the more rapidly the structuring of the composition as a whole takes place and the shorter the relaxation times that are achieved.

However, it is to be ensured that the degree of incompatibility achieved with the rheological agent does not become too great that phase separation of the constituents of the silicone composition occurs. Furthermore, it is to be ensured that the rheological agent does not impair the platinum-catalyzed addition crosslinking. These conditions are satisfied particularly well by the polar compounds listed under (F1), (F2) and (F3).

It can thus be understood how the relaxation time can purposively be adjusted by means of the rheological agent (F). The relaxation time can be shortened (and hence the structure build-up accelerated) by either (i) increasing the content of rheological agent or (ii) selecting those agents (F) that have a higher polarity and surface energy. The relaxation time can also be shortened by using (iii) lower viscosity silicone constituents or (iv) more highly polar silicone resins, but this is less desirable in view of the desired mechanical properties of the silicone molding. The person skilled in the art is thus able to select the most suitable method, taking into account the other marginal conditions to be placed on the silicone composition. The exact adjustment of the relaxation time $\tau$ can thus be achieved by simple routine experiments, as described.

Adjustment of the Flow Behavior Index n:

The use of the rheological agent (F) in combination with a silicone resin (A) is accompanied by the formation of a silicone resin network structure based on physical interactions, which results in an increase in viscosity and the formation of a flow limit. It is important for the processability of such a silicone composition by the DOD 3D printing method that the composition experiences a sufficient reduction in viscosity under shear in order to be able to be jetted out of the print valve in the form of a fine droplet. This reduction in viscosity as the shear speed increases is referred to as shear-thinning behavior and can be quantified by means of the nominal flow behavior index n. Shear-thinning behavior is present when the nominal flow behavior index n assumes negative values.

Silicone compositions generally exhibit shear-thinning behavior, that is to say the nominal flow behavior index n is negative. Surprisingly, however, it has been found that, regardless of the processability of the silicone composition, which is definitely possible at a sufficiently low viscosity under intense shear, a satisfactory printed image is obtained by the DOD 3D printing method only when the nominal flow behavior index n lies within a specific range. It is thus entirely possible that a composition that has lower viscosity under high shear will yield a poorer printed image than a composition which is more highly viscous under the same high shear. The critical factor, rather, is the degree of shear-thinning behavior, that is to say how pronounced is the reduction in viscosity that occurs when the shear speed increases.

In other words: although a sufficiently low viscosity at a high shear rate is a necessary condition for processability by the DOD method, it is not a sufficient condition for a good printed image. A necessary and at the same time sufficient condition therefor is the above-mentioned relationship $-1<n<-0.10$ (in combination with a relaxation time within the range according to the invention).

There are in principle the following possibilities for bringing the nominal flow behavior index n into the range according to the invention:

As in the case of the adjustment of the relaxation time, the most effective way of adjusting the shear-thinning behavior is by the suitable choice of the rheological agent (F). In particular, it is possible to adjust the surface energy of the silicone resin (A) by means of (F) in such a manner that the silicone resin particles in the hydrophobic, non-polar silicone matrix build up a network based on physical interactions. This network impedes the flowability of the silicone constituents in the resting state but collapses as soon as the silicone composition is subjected to more intense shear, that is to say the flowability of the silicone constituents increases considerably under intense shear, which is equivalent to pronounced shear-thinning behavior.

The breakdown of the silicone resin network effected by the intense shear in the jetting method is reversible, that is to say the composition returns to the original equilibrium state when the shear is removed (relaxation).

Accordingly, if the nominal flow behavior index n is found to be too high, that is to say $>-0.10$ (corresponding to shear thinning that is too low), this can be counteracted (i) by lowering the hydrophobicity of the silicone resin, (ii) by increasing the silicone resin concentration and in particular (iii) by increasing the content of rheological agent (F) and/or (iv) by selecting a rheological agent (F) with higher polarity or surface energy.

Too pronounced structure formation in the silicone composition, which would be expressed as extremely low values of the flow behavior index ($n<-1.00$), must be avoided, however, since this would prevent the jetting of fine droplets. Those skilled in the art can thus select the most suitable method, taking into account the other marginal conditions to be set on the silicone composition. The exact adjustment of the nominal flow behavior index n can thus be achieved by simple routine experiments, as described.

Viscosity Determination

The viscosities of the individual constituents of the silicone compositions are measured using an "MCR 302" rheometer from Anton Paar in accordance with DIN EN ISO 3219: 1994 and DIN 53019, wherein a cone-plate system (CP50-2 cone) having an opening angle of 2° was used. The instrument was calibrated with normal oil 10000 from the Physikalisch-Technische Bundesanstalt. The measuring temperature is 25.00° C. +/−0.05° C., and the measuring time is 3 minutes. The viscosity is given as the arithmetic mean of three independently conducted individual measurements. The measurement inaccuracy of the dynamic viscosity is 1.5%. The shear speed gradient was chosen in dependence on the viscosity and is reported separately for each stated viscosity.

Rheological Measuring Method for Determining the Relaxation Time $\tau$ and the Nominal Flow Behavior Index n of the Silicone Compositions All measurements were carried out using an MCR 302 rheometer with air bearing from Anton Paar at 25° C., unless indicated otherwise, in accordance with DIN EN ISO 3219. Measurement was made with plate-plate geometry (diameter 25 mm) with a gap width of 300 µm. Excess sample material was removed by means of a wooden spatula after setting of the measuring gap (so-called trimming).

Before the start of the actual measuring profile, the sample was subjected to a defined pre-shear in order to eliminate the rheological history from applying to the sample and setting the measuring position. This pre-shear (measuring phase 1) includes a shear phase of 60 s at a shear rate of $V_1=0.5$ s$^{-1}$, wherein a constant viscosity value $\eta_{MP1}$ is very quickly established (at the end of measuring phase 1). Immediately thereafter, intense shear at a shear rate of $v_2=25$ s$^{-1}$ takes place for 60 s (measuring phase 2), whereby the viscosity suddenly falls to a very low, constant value $\eta_{MP2}$ as a result of the shear-thinning behavior (at the end of measuring phase 2).

In measuring phase 3, which follows immediately and lasts 60 s, weak shear at $v_3=0.5$ s$^{-1}$ takes place, whereby, according to the relaxation speed, there is a rapid increase in the viscosity to almost the starting level (which had become established at the end of measuring phase 1). The change over time in the viscosity η(t) during measuring phase 3 was approximated by means of the function according to formula (V)

$$\eta(t)=\eta_{max}+(\eta_0-\eta_{max})*EXP(-t/\tau), \quad (V),$$

wherein η(t) is the viscosity at time t, starting at t=0 immediately at the end of measuring phase 2, $\eta_{max}$ denotes the maximum viscosity achieved in measuring phase 3, $\eta_0$ is the viscosity measured immediately at the end of measuring phase 2 (that is to say at time t=0), and EXP denotes the e-function.

The relaxation time τ so defined describes how quickly the viscosity of an intensely sheared composition recovers when the shear is (almost) removed. 60 measuring points (η,t) were recorded in measuring phase 3 ($\eta_1$,1), ($\eta_2$,2), ..., ($\eta_{60}$,60) and (together with the value pair ($\eta_0$,0)) converted into an EXCEL® format. The determination of the parameter τ which can be chosen freely in formula (V) was carried out by minimizing the sum of the error squares between the experimentally determined viscosity values and the viscosity values calculated according to formula (V) by varying the parameter τ, that is to say τ was so calculated that the experimentally determined (η,t) values are described in the best possible manner (in the sense of the smallest sum of the error squares) by the function (V). The approximation was carried out by means of the "Solver" program which is available in EXCEL® with the "GRG nonlinear" solving method. It was shown that the viscosity relaxation behavior of the silicone compositions can excellently be described by means of formula (V), in particular by means of the parameter τ (relaxation time).

The determination of the nominal flow behavior index n and of the nominal flow consistency index K according to formula (VI)

$$\log \eta = \log K + n*\log v, \quad (VI)$$

was carried out by means of the two value pairs ($v_1$; $\eta_{MP1}$) and ($v_2$; $\eta_{MP2}$) by insertion into formula (VI) (two equations with two unknowns).

Silicone compositions according to the invention can be produced in one-, two- or multi-component form. In the simplest case, production takes place in the form of a one-component silicone composition according to the invention by uniform mixing of all the components.

The resin-reinforced silicone compositions according to the invention are used in the production of molded bodies by means of ballistic generative DOD methods (3D printing).

The present invention therefore further provides a method for producing silicone molded bodies, which method is characterized in that the molded bodies are built up from the silicone compositions according to the invention by means of ballistic generative DOD methods (3D printing).

EXAMPLES

The following examples serve to illustrate the invention without limiting it.

Rheological Measuring Method

Rheological measurements were carried out in the examples in the same manner as described above.

Conditioning of the Silicone Compositions

The silicone compositions used for the DOD 3D printing were all devolatilized prior to processing by storing 100 g of the composition in an open PE can in a desiccator for 3 hours under a vacuum of 10 mbar and at room temperature. The composition was then filled in an air-free manner into a 30 ml cartridge with a bayonet closure and closed by means of a suitable ejection plunger (plastics plunger).

The Luer lock cartridge was then screwed in a liquid-tight manner into the vertical cartridge mount of the Vermes dispensing valve with the Luer lock connector pointing downwards, and 3 to 8 bar of compressed air was applied to the print plunger on the upper side of the cartridge; the ejection plunger situated in the cartridge prevents the compressed air from entering the previously evacuated silicone composition. All the UV-sensitive silicone compositions were produced under yellow light (with the exclusion of light below 700 nm), devolatilized in the same manner and filled into light-impermeable 30 ml cartridges with Luer lock bayonet closures. In order to prevent the silicone compositions from absorbing air during storage, the cartridge containers with aluminum-coated PE inliners were packaged in vacuo using a vacuum sealing device from Landig+Lava GmbH & Co. KG, Valentinstraße 35-1,D-88348 Bad Saulgau.

Raw Materials and Silicone Compositions Used

Organosilicone Resin According to Constituent (A):

A1: A vinyl-functional MQ silicone resin powder of M, $M^{vinyl}$ and Q structural units having a molecular weight: Mw=5300 g/mol, Mn=2400 g/mol, a vinyl content of 70 mmol vinyl/100 g and a ratio of $M^{vinyl}$:M:Q=0.09:0.72:1.00.

Vinyl-functional Polyorganosiloxanes According to Constituent (B):

B1: Vinyldimethylsiloxy-terminated polydimethylsiloxane having a viscosity of 1000 cSt., obtainable from ABCR GmbH, Karlsruhe, Germany under the product name "Poly (dimethylsiloxane), vinyldimethylsiloxy terminated; viscosity 1000 cSt.", order no. AB109358, CAS no, [68083-19-2].

B2: Vinyldimethylsiloxy-terminated polydimethylsiloxane having a viscosity of 20,000 cSt., obtainable from ABCR GmbH, Karlsruhe, Germany under the product name "Poly(dimethylsiloxane), vinyldimethylsiloxy terminated; viscosity 20000 cSt.", order no. AB128S73, CAS [68083-19-2] (ABCR catalog).

B3: Vinyidimethylsiloxy-terminated polydimethylsiloxane having a viscosity of 100,000 cSt., obtainable from ABCR GmbH, Karlsruhe, Germany under the product name "Poly(dimethylsiloxane), vinyldimethylsiloxy terminated; viscosity 100,000 cSt.", DMS-V51, CAS [68083-19-2] (ABCR catalog).

SiH-functional Siloxanes According to Constituent (C):

C1: SiH-terminated polydimethylsiloxane having a molecular weight of Mn=28,000 g/mol, a viscosity of 1000 mPa·s and a hydrogen content (Si-bonded) of 0.007% by weight, obtainable from Gelest, Inc. (65933 Frankfurt am Main, Germany) under the product name DMS-H31.

C2: Methylhydrosiloxane-dimethylsiloxane copolymer having a molecular weight of Mn=1900-2000 g/mol and a methylhydrogensiloxy content of 25-30 mol. %, obtainable from Gelest, Inc. (65933 Frankfurt am Main, Germany) under the product name HMS-301.

C3: Methylhydrosiloxane-dimethylsiloxane copolymer having a molecular weight of Mn=900-1200 g/mol and a methylhydrogensiloxy content of 50-55 mol. %, obtainable from Gelest, Inc. (65933 Frankfurt am Main, Germany) under the product name HMS-501.

Hydrosilylation Catalyst According to Constituent (E):

E1: UV-activatable platinum catalyst: trimethyl-(methylcyclopentadienyl)-platinum(IV), obtainable from Sigma-Aldrich®, Taufkirchen, Germany.

Rheological Agent According to Constituent (F):

F1; (3-Glycidoxypropyl)trimethoxysilane, 98%, obtainable from ABCR GmbH, 76187 Karlsruhe, Germany, CAS no. [2530-83-8], under article no./product name AB111152

F2: Epoxidized linseed oil, CAS no. 67746-08-1, "Edenol® B 316 Spezial"; Emery Oleochemicals GmbH, Henkelstr. 67, 40589 Dusseldorf, F3: DRAPEX 39, an epoxidized soybean oil from Galata Chemicals GmbH, Chemiestraße 22, 68623 Lampertheim, CAS no. [801307-8]

Optional Constituent (G)

G1: Stabilizer (inhibitor) 1-ethynylcyclohexanol; 99%, CAS no. 78-27-3, ≥99%, obtainable from ABCR GmbH, 76187 Karlsruhe, Germany

Examples 1-24 According to the Invention and not in Accordance with the Invention The silicone compositions were produced (under yellow light or with the exclusion of light) by intimately mixing all the constituents according to the weight ratios given in the following tables in Speedmixer® mixing beakers with a screw closure from Hauschild & Co. KG, Waterkamp 1, 59075 Hamm. To that end, the components were weighed in succession into the corresponding mixing beaker and mixed by hand. The beaker was then closed with a suitable screw cap and mixed and degassed in a vacuum Speedmixer® DAC 400.2 VAC-P from Hauschild & Co. KG, Waterkamp 1, 59075 Hamm for at least 5 minutes at 1500 rpm under a vacuum of 100 mbar.

A small hole was drilled in the screw cap prior to the vacuum mixing operation in the vacuum Speedmixer® in order to allow the air to escape from the mixing beaker.

The composition from the mixing beaker was then filled in an air-free manner into a light-tight 30 ml Luer lock cartridge (by means of a filling system from Hauschild, consisting of a suitable speed disk and a lever press). The cartridge was then closed with a suitable ejection plunger (plastics plunger).

The compositions of the silicone compositions according to the invention and not in accordance with the invention are indicated in tables 1 to 4.

TABLE 1

| Constituent | Ex. 1 | Ex. 2*⁾ | Ex. 3*⁾ | Ex. 4*⁾ | Ex. 5*⁾ | Ex. 6*⁾ |
|---|---|---|---|---|---|---|
| A1 | 54.5 | 28.2 | 27.2 | 27.0 | 44.5 | 39.7 |
| B1 | 9.2 | 14.1 | 13.6 | 9.5 | 9.4 | 45.2 |
| B2 | 25.2 | 42.4 | 40.8 | 56.0 | 37.6 | — |
| C2 | — | — | — | 7.5 | — | 15.1 |
| C3 | 10.1 | 14.3 | 18.4 | — | 8.5 | — |
| E1 | 0.0015 | 0.0015 | 0.0015 | 0.0015 | 0.0015 | 0.0015 |
| F1 | 1.00 | 1.00 | — | — | — | — |
| G1 | 0.0025 | 0.025 | 0.0025 | 0.0025 | 0.0025 | 0.0025 |
| Nominal flow behavior index n | | | | | | |
| n [—] | −0.70 | −0.31 | −0.003 | 0 | −0.008 | −0.005 |
| Nominal flow consistency index K | | | | | | |
| K [Pa · s$^{n+1}$] | 487 | 35 | 6 | 10 | 33 | 2 |
| Relaxation time τ | | | | | | |
| τ [s] | 8.22 | <0.001 | <0.001 | <0.001 | 5.34 | <0.001 |

*⁾not in accordance with the invention

In example 2, which is not in accordance with the invention, the structure build-up, or viscosity increase, takes place too quickly, so that the relaxation time t is too short. Although a structure is present in the resting state through the use of F1 (shear thinning, as shown by n=−0.31), the resting viscosity of the composition in example 2 is much lower than in example 1, due to the low content of A1 and the high content of B1 and B2, so that this low viscosity is established again almost immediately when the shear is removed (relaxation time too short). For example, by lowering the content of silicone constituents B1 and B2 and/or by increasing the viscosity of these constituents, the relaxation time can be so adjusted that it lies within the claimed range.

Examples 3 to 6, which are not in accordance with the invention, do not contain rheological agent (F), so that the flow behavior index n here is too high, that is to say there is no or insufficient shear-thinning behavior. By using a rheological agent (F) in a sufficient amount, the flow behavior index can be so adjusted that it lies within the claimed range.

TABLE 2

| Constituent | Ex. 7*⁾ | Ex. 8 | Ex. 9 | Ex. 10*⁾ | Ex. 11*⁾ | Ex. 12*⁾ |
|---|---|---|---|---|---|---|
| A1 | 39.3 | 38.9 | 40.4 | 25.9 | 44.6 | 42.7 |
| B1 | 44.8 | 44.3 | 46.1 | 13.4 | 9.4 | 48.7 |
| B2 | — | — | — | 48.4 | 37.7 | — |
| C2 | 14.9 | 14.8 | — | — | — | — |
| C3 | — | — | 11.5 | 12.3 | 8.4 | 8.6 |
| E1 | 0.0015 | 0.0015 | 0.0015 | 0.0015 | 0.0015 | 0.0015 |
| F1 | 1.00 | 2.00 | 2.00 | — | — | — |
| G1 | 0.0025 | 0.0025 | 0.0025 | 0.0025 | 0.0025 | 0.0025 |
| Nominal flow behavior index n | | | | | | |
| n [—] | 0 | −0.49 | −0.39 | 0 | 0 | 0 |
| Nominal flow consisteney index K | | | | | | |
| K [Pa · s$^{n+1}$] | 3 | 26 | 20 | 7 | 40 | 7 |
| Relaxation time τ | | | | | | |
| τ [s] | <0.001 | 5.31 | 11.39 | <0.001 | <0.001 | <0.001 |

*⁾not in accordance with the invention

Example 7, which is not in accordance with the invention, has a flow behavior index of n=0 (Newtonian behavior), that is to say there is no shear-thinning behavior. In example 7, a structure (network) is not built up in the resting state despite the presence: of resin particles and F1. Because example 7 exhibits Newtonian behavior, the relaxation time is also infinitely high (starting viscosity is reached immediately since it has not changed). If the content of F1 is increased (see examples 8 and 9), the structure build-up takes place in the resting state and the composition then exhibits shear-thinning behavior (n becomes negative). After shear, the resin particles now modified with an increased amount of F1 require a certain time (the relaxation time) to form the structure again.

Examples 10 to 12, which are not in accordance with the invention, do not contain rheological agent (F) so that a flow behavior index n of only 0 is obtained in each case, that is to say there is no shear-thinning behavior. By using a rheological agent (F) in a sufficient amount, the flow behavior index can be so adjusted that it lies within the claimed range (see examples 8 and 9).

TABLE 3

| Constituent | Ex. 13 | Ex. 14 | Ex. 15 | Ex. 16 | Ex. 17 | Ex. 18 |
|---|---|---|---|---|---|---|
| A1 | 25.6 | 44.2 | 42.3 | 25.4 | 43.7 | 41.9 |
| B1 | 13.3 | 9.3 | 48.2 | 13.2 | 9.2 | 47.7 |
| B2 | 48.0 | 37.3 | — | 47.5 | 37.0 | — |
| C3 | 12.2 | 8.3 | 8.6 | 12.1 | 8.2 | 8.5 |
| E1 | 0.0015 | 0.0015 | 0.0015 | 0.0015 | 0.0015 | 0.0015 |
| F1 | 1.00 | 1.00 | 1.00 | 2.00 | 2.00 | 2.00 |
| G1 | 0.0025 | 0.0025 | 0.0025 | 0.0025 | 0.0025 | 0.0025 |

TABLE 3-continued

| Constituent | Ex. 13 | Ex. 14 | Ex. 15 | Ex. 16 | Ex. 17 | Ex. 18 |
|---|---|---|---|---|---|---|
| Nominal flow behavior index n | | | | | | |
| n [—] | −0.11 | −0.78 | −0.43 | −0.15 | −0.77 | −0.56 |
| Nominal flow consistency index K | | | | | | |
| K [Pa·$s^{n+1}$] | 17 | 630 | 40 | 21 | 640 | 73 |
| Relaxation time τ | | | | | | |
| τ [s] | 5.50 | 3.89 | 7.92 | 4.74 | 2.60 | 2.01 |

*)not in accordance with the invention

TABLE 4

| Constituent | Ex. 19*) | Ex. 20 | Ex. 21*) | Ex. 22 | Ex. 23 | Ex. 24*) |
|---|---|---|---|---|---|---|
| A1 | 27.3 | 38.8 | 39.2 | 38.9 | 38.9 | 36.3 |
| B1 | — | 38.8 | 39.3 | 39.0 | 39.0 | — |
| B2 | 45.9 | — | — | — | — | 15.6 |
| B3 | 18.6 | — | — | — | — | 40.6 |
| C1 | — | 11.3 | 11.4 | 11.3 | 11.3 | — |
| C3 | 8.0 | 10.0 | 10.1 | 10.0 | 10.0 | 7.5 |
| E1 | 0.0015 | 0.0015 | 0.0015 | 0.0015 | 0.0015 | 0.0015 |
| F1 | — | 1.14 | — | — | — | — |
| F2 | — | — | — | 0.79 | — | — |
| F3 | — | — | — | — | 0.79 | — |
| G1 | 0.0025 | 0.0025 | 0.0025 | 0.0025 | 0.0025 | 0.0025 |
| Nominal flow behavior index n | | | | | | |
| n [—] | −0.003 | −0.77 | −0.001 | −0.79 | −0.79 | −0.004 |
| Nominal flow consistency index K | | | | | | |
| K [Pa·$s^{n+1}$] | 17 | 165 | 3 | 210 | 201 | 21 |
| Relaxation time τ | | | | | | |
| τ [s] | 5.51 | 2.53 | <0.001 | 2.59 | 2.23 | <0.001 |

*)not in accordance with the invention

Examples 19, 21 and 24, which are not in accordance with the invention, do not contain rheological agent (F), so that the flow behavior index n here is too high, that is to say there is insufficient shear-thinning behavior. By using a rheological agent (F) in a sufficient amount, the flow behavior index can be so adjusted that it lies within the claimed range (see examples 20, 22 and 23 according to the invention).

DOD 3D printer;

The silicone compositions produced were processed to silicone elastomer parts by the DOD method in a "NEO 3D printer" manufacturing system from "German RepRap GmbH". For this purpose, the above-mentioned 3D printer was converted and adapted. The thermoplastic filament dispensing unit originally fitted in the "NEO 3D printer" was replaced by a jetting nozzle from "Vermes Microdispensing GmbH, Otterfing" in order to be able to deposit higher viscosity to self-supporting/pasty compositions such as the silicone compositions according to the invention by the DOD method.

Since the "NEO" printer was not equipped as standard for the installation of jetting nozzles, it was modified. The Vermes jetting nozzle was integrated into the printer control system in such a manner that the start-stop signal (trigger signal) of the Vermes jetting nozzle was actuated by the G-code controller of the printer. To that end, a special signal was stored in the G-code controller. The G-code controller of the computer hence merely switched the jetting nozzle on and off (start and stop of dispensing).

For the signal transmission of the start-stop signal, the heating cable of the filament heating nozzle originally fitted in the "NEO" printer was separated and connected to the Vermes nozzle via a relay.

The other dispensing parameters (dispensing frequency, rising, falling, etc.) of the Vermes jetting nozzle were adjusted by means of the MDC 3200+ microdispensing control unit.

The 3D printer was controlled by means of a computer. The software control and control signal connection of the 3D printer (software: "Repitier-Host") was modified so that it was possible to control therewith both the movement of the dispensing nozzle in the three spatial directions and the signal for drop deposition. The maximum displacement speed of the "NEO" 3D printer is 0.3 m/s.

Dispensing System:

The dispensing system employed for the silicone compositions used was the "MDV 3200A" microdispensing system from "Vermes Microdispensing GmbH", consisting of a complete system with the following components: a) MDV 3200 A—dispensing unit having a connector for Luer lock cartridges, which were subjected on the upper side of the cartridge to compressed air at 3-8 bar, b) Vermes associated nozzle heating system MDH-230tfl left, c) MDC 3200+ MicroDispensing control unit, which was again connected to the PC controller and, via movable cables, to the nozzle, permitted adjustment of the jetting dispensing parameters (rising, falling, opentime, needlelift, delay, no pulse, heater, nozzle, spacing, voxel diameter, preliminary air pressure at the cartridge). Nozzles with diameters of 50, 100, 150 and 200 μm are available. It was thus possible to place very fine droplets of the silicone composition in the nanoliter range with the utmost precision at any desired xyz position on the working plate, or the already crosslinked silicone elastomer layer. Unless indicated otherwise, a 200 μm nozzle was fitted into the Vermes valve as standard nozzle insert. The storage containers used for the silicone composition were vertical 30 ml Luer lock cartridges, which were screwed to the dispensing nozzle in a liquid-tight manner and subjected to compressed air.

The modified "NEO" 3D printer and the "Vermes" dispensing system were controlled by a PC and "Simplify 3D" open-source software.

Jetting:

The silicone compositions were repeatedly deposited dropwise in layers of the desired geometry on a glass specimen slide having a 25×75 mm surface using the jetting nozzle parameters indicated hereinbelow, wherein the deposited composition was continuously irradiated throughout the printing operation (about 50 seconds) with a BLUE-POINT irradiation system with a power of 13,200 mW/cm² and thereby crosslinked.

Nozzle diameter: 200 μm, rising: 0.3 ms, failing: 0.1 ms, open time: 15 ms, needle lift: 100%, delay (area printing): 25 ms, delay (individual points for voxel size measurement): 100 ms, heating: 45° C., cartridge pre-pressure: 3 bar.

The silicone compositions according to the invention and not in accordance with the invention are listed in tables 1 to 4 with the characteristic rheological parameters (relaxation time τ and nominal flow behavior index n).

In the manner described above, transparent silicone elastomer parts of different geometries were obtained without difficulty by the DOD method using the silicone compositions according to the invention, while the silicone compositions which were not in accordance with the invention exhibited numerous shortcomings in DOD processing which prevented the production of high-quality silicone moldings.

Figure 2:
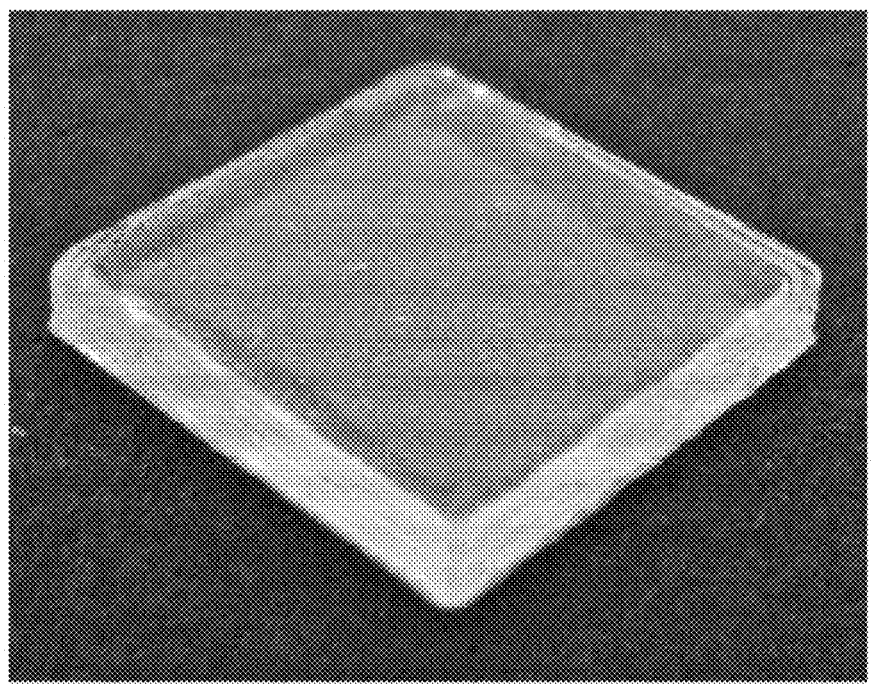
FIG. 2 illustrates a 3D molding produced from a further embodiment of a curable silicone 3D printing composition in accordance with the invention.
Figure 4:
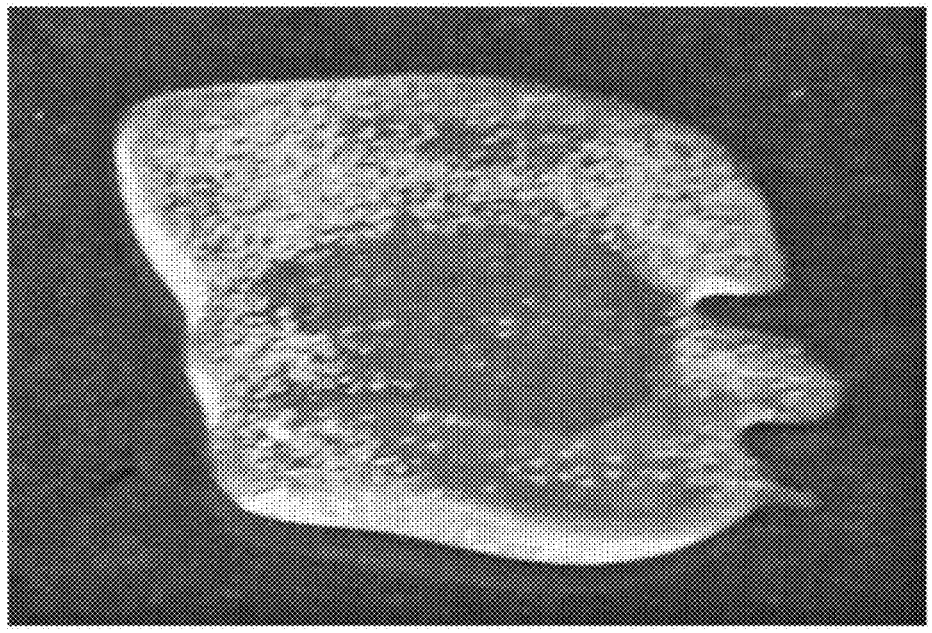
FIG. 4 illustrates a 3D molding prepared from a non-inventive composition.
Figure 5:
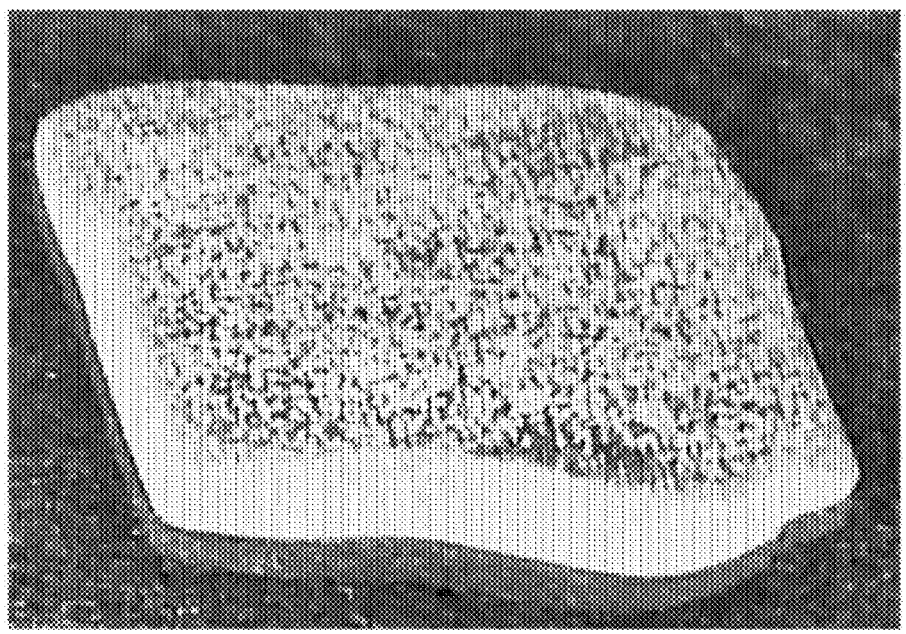
FIG. 5 illustrates a further 3D molding prepared from a further non-inventive composition.

As representatives of the silicone compositions according to the invention indicated in tables 1 to 4, FIGS. 1 and 2 show the silicone moldings produced by the DOD method according to example 1 and example 8. As representatives of the silicone compositions not in accordance with the invention indicated in tables 1 to 4, FIGS. 4 and 5 show the silicone moldings produced by the DOD method according to example 2 and example 3.

Example 1

The silicone composition according to the invention has a nominal flow behavior index of n=−0.70 and a relaxation time of τ=8.22 seconds and could be jetted without difficulty by the DOD method (voxel diameter 1.1 mm) and built up layerwise to form a transparent rectangular spiral having an outer circumference of 20×20 mm and a height of 5 mm (see FIG. 1).

Example 8

Figure 3:
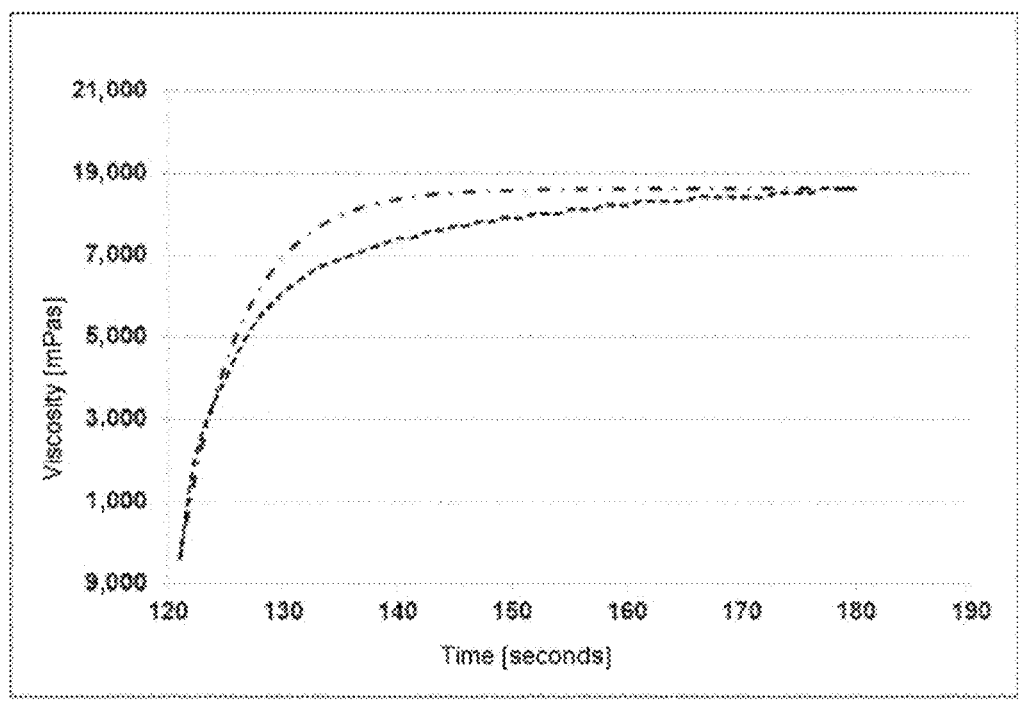
FIG. 3 illustrates the measured viscosity/time behavior of the composition of Example 8 compared to the theoretical behavior.

The silicone composition according to the invention has a nominal flow behavior index of n=−0.49 and a relaxation time of τ=5.31 seconds and could be jetted without difficulty by the DOD method (voxel diameter 0.9 mm) and processed layerwise to form a silicone elastomer part of quadrangular form measuring 15×15×3 mm (see FIG. 2). FIG. 3 shows the measuring curve of example 8 determined by means of the rheological measuring method, in comparison with its theoretical curve according to formula (V).

In FIG. 3
Vis=viscosity [mPa·s]
τ=time [sec]
---- =measuring curve
- · - =theoretical curve Jetting of the silicone compositions which were not in accordance with the invention yielded an unclean printed image, which was caused by partially incomplete separation of the individual drops (the drops remain connected together via thin threads, that is to say drop separation was incomplete). In addition, the drops meeting the working surface formed very wide, flat voxels, the diameters of which were about 1500 µm.

As a result of this spreading during printing, finer structural details could no longer be reproduced. The silicone compositions which were not in accordance with the invention tended to clog the nozzle after a short time, since the compositions ran through the jetting valve even without a print signal solely as a result of the pre-pressure in the cartridge. Stable DOD 3D printing over time was not possible. As representatives of the silicone compositions not in accordance with the invention indicated in tables 1 to 4, FIGS. 4 and 5 show the silicone moldings produced by the DOD method according to example 2 and example 3.

Example 2 (Not in Accordance with the Invention)

Using the silicone composition of example 2, which is not in accordance with the invention, it was attempted to produce a silicone elastomer part of quadrangular form measuring 15×15×3 mm by layerwise build-up with simultaneous UV irradiation. The first printed layer already exhibited an unsharp printed image. During the further printing process, the nozzle became completely clogged, so that defined single droplets were no longer dispensed, but the mass was deposited unevenly on the component from the clogged jetting nozzle and a misshapen molding resulted. The molding additionally had visible air bubbles (see white specks in the molding in FIG. 4).

Example 3 (Not in Accordance with the Invention)

Using the silicone composition which is not in accordance with the invention, it was attempted to produce a silicone elastomer part of quadrangular form measuring 15×15×3 mm by layerwise build-up without UV irradiation. In this case, the nozzle of the jetting valve became completely clogged with the deposited composition immediately after the start of the printing test. When the printing program was continued, an irregular, misshapen crosslinked molding was produced, which had visible air bubbles. When the printing program was complete, the green body was crosslinked by irradiation for 10 seconds by means of the BLUEPOINT irradiation system at a power of 13,200 mW/cm² (for the resulting molding see FIG. 5).

Example 4 (Not in Accordance with the Invention)

Using the silicone composition of example 4, which is not in accordance with the invention, it was attempted to produce a hemispherical component having a diameter of 20 mm on a glass specimen slide by layerwise build-up without UV irradiation. The formulations not in accordance with the invention led to even quicker emergence of the silicone compositions from the nozzle opening of the jetting nozzle. Even during the deposition of the first layer, a drop formed on the underside of the jetting valve, which drop increased further in size as a result of the composition continuing to emerge from the nozzle opening. The drop smeared the printed layer which had already been deposited. The further printing operation was then terminated.

The invention claimed is:
1. A crosslinkable silicone composition for 3D printing of silicone moldings by the ballistic generative DOD method, comprising:
(A) from 5 to 60% by weight of at least one organosilicone resin composed of units of the formulae

  (I),

  (II),

  (III) and

  (IV), wherein the radicals R are identical or different and are H, HO or an optionally substituted radical containing from 1 to 40 carbon atoms,
with the proviso that the content of units of formulae (III) and (IV) in the silicone resin is at least 5 mol. %,
(B) from 30 to 95% by weight of at least one organosilicon compound having, on average, at least two aliphatically unsaturated groups per molecule, with the proviso that its content of T and Q units is less than 5 mol. %,
(C) from more than 0 to 30% by weight of at least one organosilicon compound having, on average, at least two SiH groups per molecule, with the proviso that the content of T and Q units is less than 5 mol. %,
or instead of(B) and/or (C) or in addition to (B) and (C)
(D) from 0 to 95% by weight of at least one organosilicon compound having, on average, at least two aliphatically unsaturated groups and at least two SiH groups per molecule, with the proviso that the content of T and Q units is less than 5 mol. %,
wherein the amounts of constituents (B), (C) or (D) are contained in amounts such that at least one constituent that contains, on average, at least two aliphatically unsaturated groups per molecule is present, and at the same time at least one constituent that contains, on average, at least two Si-bonded hydrogen atoms per molecule is present, (E) from 0.1 to 500 ppm by weight of at least one metal-containing hydrosilylation catalyst, based on the weight of the metal of the metal-containing hydrosilylation catalyst relative to the total weight of the silicone composition, (F) from 0.01 to 5% by weight of a rheological agent (F1), (F2), and/or (F3) which contains polar groups and mixtures thereof, wherein
(F1) is an epoxy-group-functional compound,
(F2) is a (poly)ether-group-functional compound, and
(F3) is a (poly)ester-group-functional compounds,
wherein the epoxy and ether and ester groups of the rheological agent are optionally present in a single molecule, (G) from 0 to 30% by weight of auxiliary substances other than (A) through (F),
wherein
the relaxation time r of the silicone composition lies within the range of:
0.01 second$<\tau \leq 15$ seconds
wherein $\tau$ is given by formula (V):

$$\eta(t)=\eta_{max}+(\eta_0-\eta_{max})*EXP(-t/\tau), \qquad (V)$$

wherein
$\eta(t)$ is the viscosity at time t,
$\eta_0$ is the viscosity measured immediately after intense shear (that is to say at time t=0), and
$\eta_{max}$ denotes the maximum viscosity achieved within a given time after removal of the shear,
EXP denotes the e-function,
and wherein
the nominal flow behavior index n, which quantifies the degree of shear-thinning behavior of the silicone composition, lies within the range:
$-1.00<n<-0.10$
wherein n is given by formula (VI):

$$\log \eta = \log K + n * \log v, \qquad (VI)$$

wherein $\eta$ represents the viscosity at shear rate v,
K represents the nominal flow consistency index,
v represents the shear rate, and
log represents the decadic logarithm.

2. The silicone composition of claim 1, wherein the flow behavior index n of the silicone composition lies within the range:
$-0.90<n<-0.30$.

3. The silicone composition of claim 1, wherein the flow behavior index n of the silicone composition lies within the range:
$-0.80<n<-0.40$.

4. The silicone composition of claim 1, wherein the relaxation time r lies within the range:
0.1 second$<\tau \leq 12$ seconds.

5. The silicone composition of claim 2, wherein the relaxation time r lies within the range:
0.1 second$<\tau \leq 12$ seconds.

6. The silicone composition of claim 3, wherein the relaxation time r lies within the range:
0.1 second$<\tau<12$ seconds.

7. The silicone composition of claim 1, wherein the relaxation time r lies within the range:
1 second$<\tau<9$ seconds.

8. The silicone composition of claim 2, wherein the relaxation time T lies within the range:
1 second $<\tau \leq 9$ seconds.

9. The silicone composition of claim 3, wherein the relaxation time r lies within the range:
1 second$<$x5 9 seconds.

10. The silicone composition of claim 1, wherein the content of units of formula (III) and (IV) in the silicone resin (A) is at least 10 mol. %.

11. The silicone composition of claim 1, wherein the content of units of formula (III) and (IV) in the silicone resin (A) is not more than 80 mol. %.

12. The silicone composition of claim 10, wherein the content of units of formula (III) and (IV) in the silicone resin (A) is not more than 80 mol. %.

13. The silicone composition of claim 1, wherein the silicone resins (A) consist only of units of formulae (I) and (IV).

14. A method for producing elastomeric molded bodies, comprising generating a molded body from a silicone composition of claim 1 by means of a ballistic generative DOD methods (3D printing) and curing the silicone composition.

15. The method of claim 14, wherein the hydrosilylation catalyst is a light activatable hydrosilylation catalyst.

16. The method of claim 15, wherein the molded body is a transparent molded body.

* * * * *

UNITED STATES PATENT AND TRADEMARK OFFICE
CERTIFICATE OF CORRECTION

PATENT NO. : 10,669,421 B2  
APPLICATION NO. : 15/556952  
DATED : June 2, 2020  
INVENTOR(S) : Frank Achenbach et al.

Page 1 of 1

It is certified that error appears in the above-identified patent and that said Letters Patent is hereby corrected as shown below:

In the Claims

Column 30, Lines 61-62, Claim 1:  
After "at least two"  
Delete "Sill groups" and  
Insert -- SiH groups --.

Column 32, Lines 24-25, Claim 18:  
After "relaxation time"  
Delete "T" and  
Insert -- $\tau$ --.

Column 32, Lines 27-29, Claim 19:  
After "relaxation time"  
Delete "$\tau$ lies within the range:  
1 second < x5 9 seconds." and  
Insert -- $\tau$ lies within the range:  
1 second < $\tau$ ≤ 9 seconds. --.

Signed and Sealed this  
Sixth Day of October, 2020

Andrei Iancu  
*Director of the United States Patent and Trademark Office*